US00RE43114E

(19) United States
(12) Reissued Patent
Walker et al.

(10) Patent Number: US RE43,114 E
(45) Date of Reissued Patent: Jan. 17, 2012

(54) ELECTRONIC AMUSEMENT DEVICE AND METHOD FOR OPERATING SAME

(75) Inventors: Jay S. Walker, Ridgefield, CT (US); James A. Jorasch, New York, NY (US); Robert R. Lech, Dublin, OH (US)

(73) Assignee: IGT, Reno, NV (US)

(21) Appl. No.: 11/084,872

(22) Filed: Mar. 18, 2005

Related U.S. Patent Documents

Reissue of:
(64) Patent No.: 6,533,658
Issued: Mar. 18, 2003
Appl. No.: 09/706,431
Filed: Nov. 3, 2000

U.S. Applications:
(63) Continuation of application No. 09/004,885, filed on Jan. 9, 1998, now Pat. No. 6,176,781.

(51) Int. Cl.
*A63F 9/24* (2006.01)
*A63F 13/00* (2006.01)

(52) U.S. Cl. ..... 463/13; 463/11; 463/12
(58) Field of Classification Search ..... 463/10–13
See application file for complete search history.

(56) References Cited

U.S. PATENT DOCUMENTS 3,733,075 A * 5/1973 Hooker et al. ..... 273/141 A
3,735,982 A * 5/1973 Gerfin ..... 463/22
3,961,473 A * 6/1976 Hung ..... 368/3
4,013,292 A * 3/1977 Cohen et al. ..... 273/371
4,052,057 A * 10/1977 Castle ..... 463/13
4,093,223 A * 6/1978 Wilke et al. ..... 463/4
4,162,792 A * 7/1979 Chang et al. ..... 463/4
4,220,330 A * 9/1980 Montgomery ..... 273/452
4,247,925 A * 1/1981 Meshi et al. ..... 368/3
4,261,563 A * 4/1981 Goldfarb ..... 463/7
4,322,074 A * 3/1982 James et al. ..... 463/29
4,365,810 A * 12/1982 Richardson ..... 273/237
4,560,161 A * 12/1985 Hamano ..... 463/13
4,588,193 A * 5/1986 Winston ..... 273/304
4,593,904 A * 6/1986 Graves ..... 463/9
4,662,637 A * 5/1987 Pfeiffer ..... 273/149 P
4,700,948 A * 10/1987 Okada ..... 273/143 R
4,926,327 A * 5/1990 Sidley ..... 463/13
5,042,818 A * 8/1991 Weingardt ..... 463/13
5,277,424 A * 1/1994 Wilms ..... 463/12
5,326,104 A * 7/1994 Pease et al. ..... 463/18
5,370,399 A * 12/1994 Liverance ..... 463/23

(Continued)

OTHER PUBLICATIONS

Welcome to Merit's Home Page49 Merit Industries, Inc., (http www meritind com), Copyright date 1997, download date: Apr. 16, 1998.

*Primary Examiner* — Melba Bumgarner
*Assistant Examiner* — Steven J. Hylinski
(74) *Attorney, Agent, or Firm* — K&L Gates LLP

(57) ABSTRACT

An electronic amusement device and a method for operating the device are disclosed. The device conducts a game of chance that preferably incorporates game elements that change and expire during the game. The device performs the steps of generating and displaying a subject game element having a first class. The step of displaying includes displaying an indicia of the first class. The device further assigns a second class to the subject game element, and displays the subject game element, thereby displaying an indicia of the second class.

15 Claims, 22 Drawing Sheets

U.S. PATENT DOCUMENTS 5,382,025 A * 1/1995 Sklansky et al. ..... 273/292
5,531,440 A * 7/1996 Dabrowski et al. ..... 463/12
5,674,128 A * 10/1997 Holch et al. ..... 463/42
5,732,950 A * 3/1998 Moody ..... 273/292
5,816,915 A * 10/1998 Kadlic ..... 463/13
5,833,536 A * 11/1998 Davids et al. ..... 463/11
5,833,537 A * 11/1998 Barrie ..... 463/21
5,868,618 A * 2/1999 Netley et al. ..... 463/13
5,882,258 A * 3/1999 Kelly et al. ..... 463/11
5,897,436 A * 4/1999 Singer et al. ..... 273/293
5,908,353 A * 6/1999 Andrews ..... 463/13
5,935,002 A * 8/1999 Falciglia ..... 463/19
5,971,849 A * 10/1999 Falciglia ..... 463/16
5,980,384 A * 11/1999 Barrie ..... 463/16
6,093,100 A * 7/2000 Singer et al. ..... 463/13
6,120,031 A * 9/2000 Adams ..... 273/292
6,176,781 B1 * 1/2001 Walker et al. ..... 463/13
6,568,680 B1 * 5/2003 Moody et al. ..... 273/292
6,672,958 B2 * 1/2004 Bennett ..... 463/13
7,404,762 B2 * 7/2008 Moody ..... 463/13

* cited by examiner

200

| | OUTCOME 210 | PAYOUT 220 |
|---|---|---|
| 232 | ROYAL FLUSH | $100 |
| 234 | STRAIGHT FLUSH | $25 |
| 236 | FOUR OF A KIND | $15 |
| 238 | FULL HOUSE | $5 |
| 240 | FLUSH | $3 |
| 242 | STRAIGHT | $2 |
| 244 | THREE OF A KIND | $1 |
| 246 | TWO PAIR | $0 |
| 248 | ONE PAIR | $0 |
| 250 | HIGH CARD | $0 |

FIG. 2

300

| | CARD IDENTIFIER 310 | RANK 312 | SUIT 314 | STATUS 316 | LOCATION 318 | TIME DEALT 320 | DURATION 322 |
|---|---|---|---|---|---|---|---|
| 340 | 11 | 8 | CLUB | IN DECK | 5 | N/A | N/A |
| 342 | 26 | 10 | HEART | DEALT | FIRST ROW SECOND POSITION | 09:05:36 | 120 SECONDS |
| 344 | 32 | J | CLUB | DEALT | FIRST ROW THIRD POSITION | 09:05:39 | 120 SECONDS |
| 346 | 15 | 4 | SPADE | DISCARDED | DISCARDS | 08:56:25 | N/A |
| 348 | 9 | A | DIAMOND | FIRST ALTERATION WARNING | FIRST ROW FIRST POSITION | 09:03:22 | 120 SECONDS |

FIG. 3

ELECTRONIC AMUSEMENT DEVICE AND METHOD FOR OPERATING SAME

Matter enclosed in heavy brackets [ ] appears in the original patent but forms no part of this reissue specification; matter printed in italics indicates the additions made by reissue.

This application is a continuation of U.S. patent application Ser. No. 09/004,885, filed Jan. 9, 1998 now U.S. Pat. No. 6,176,781 for "ELECTRONIC AMUSEMENT DEVICE AND METHOD FOR OPERATING SAME."

BACKGROUND OF THE INVENTION

1. Field of the Invention

The present invention relates to an electronic amusement device and more particularly to an electronic amusement device such as a slot machine having the ability *to* display game symbols which change or expire during a game.

2. Description of the Related Art

Slot machines generate greater than ten billion dollars per year in revenue for US casinos, with individual machines typically earning between fifty and one hundred and fifty dollars per day. One of the fastest growing segments of slot machine play is video poker, a game in which various elements of draw poker are represented on a video display. Players draw and hold cards in an effort to attain a hand high enough to qualify for a prize or payment. Starting with "Jacks or Better," video poker quickly expanded into "Deuces Wild" and "Joker Poker" as well as countless variations of the above with different payout schedules. Players are attracted to the relatively high payouts possible for top hands such as a royal flush, as well as the frequent lower-end payouts for hands as low as a pair of jacks. Additionally, many players find that the interactive nature of the game, choosing which cards to draw, provides a more exciting game than the traditional reel-based slot machine, in which the player simply passively watches the outcome.

Although popular with players, video poker has a number of disadvantages from the casino's perspective. First, game speed can be significantly slower than conventional reel machines. Players sometimes agonize over a particular play, taking their time in deciding what the correct play is. With no incentive to accelerate play, players sometimes languish over their decisions. Casinos prefer a faster-paced game since profits rise in direct proportion to the number of hands completed per hour. Additionally, the house edge associated with video poker has consistently deteriorated as casinos have begun to compete more for players. Because full payout tables are provided on the face of the machine, players can easily distinguish between high payout machines and low payout machines. Competition for video poker players has resulted in some video poker machines which pay out in excess of 100% with perfect playing strategy. Although most players are not playing perfectly, the growing availability of books and computer software is resulting in more and more sophisticated players. The slow play and declining house advantage, when combined with the significant cost of player complimentaries, such as free meals and drinks, has resulted in shrinking casino profits for video poker. Consequently, there is a need to increase the house advantage without appearing to disadvantage the player.

Thus, it would be very desirable to provide a slot machine which offers to players the involvement and excitement of video poker while offering the casino the speed of play and high house advantage currently associated with traditional reel slot machines. Such a machine could result in significantly enhanced revenues for casino operators and provide more enjoyable play for casino patrons.

SUMMARY OF THE INVENTION

An object of the present invention is to provide a gaming device utilizing game symbols that expire throughout a game.

In accordance with one aspect of the present invention, an electronic amusement device and method is disclosed for conducting a game of chance. The method includes the steps of generating a subject game element having a first class, and displaying the subject game element, thereby displaying an indicia of the first class. The method also includes the step of assigning a second class to the subject game element. The method further includes the step of displaying the subject game element, thereby displaying an indicia of the second class. The disclosed electronic amusement device implements the steps of the described method.

In accordance with a second aspect of the present invention, an electronic amusement device and method is disclosed for conducting a game of chance. The method includes the steps of receiving a game element request signal and generating a game element having a first class. The method also includes the step of displaying the game element, thereby displaying an indicia of the first class. The method further includes the steps of receiving a placement signal and displaying the game element at a location in accordance with the received placement signal. A second class is assigned to the game element, and the game element is redisplayed, thereby displaying an indicia of the second class.

DESCRIPTION OF THE DRAWINGS

These and other objects, features and advantages of the invention will be understood from a consideration of the following description of the invention, in which.

Figure 1:
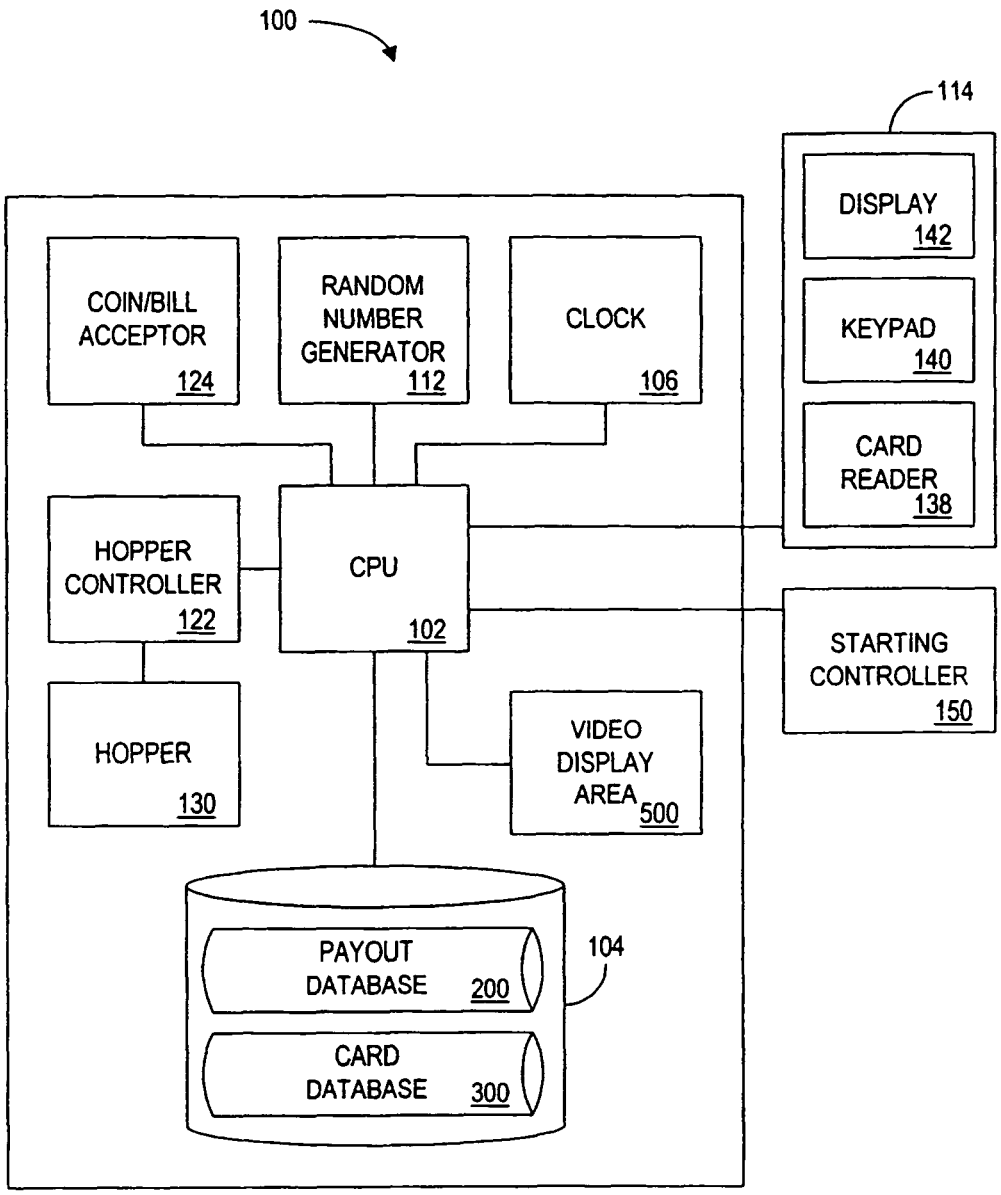
FIG. 1 is a block diagram of a gaming device constructed in accordance with the present invention.
Figure 4:
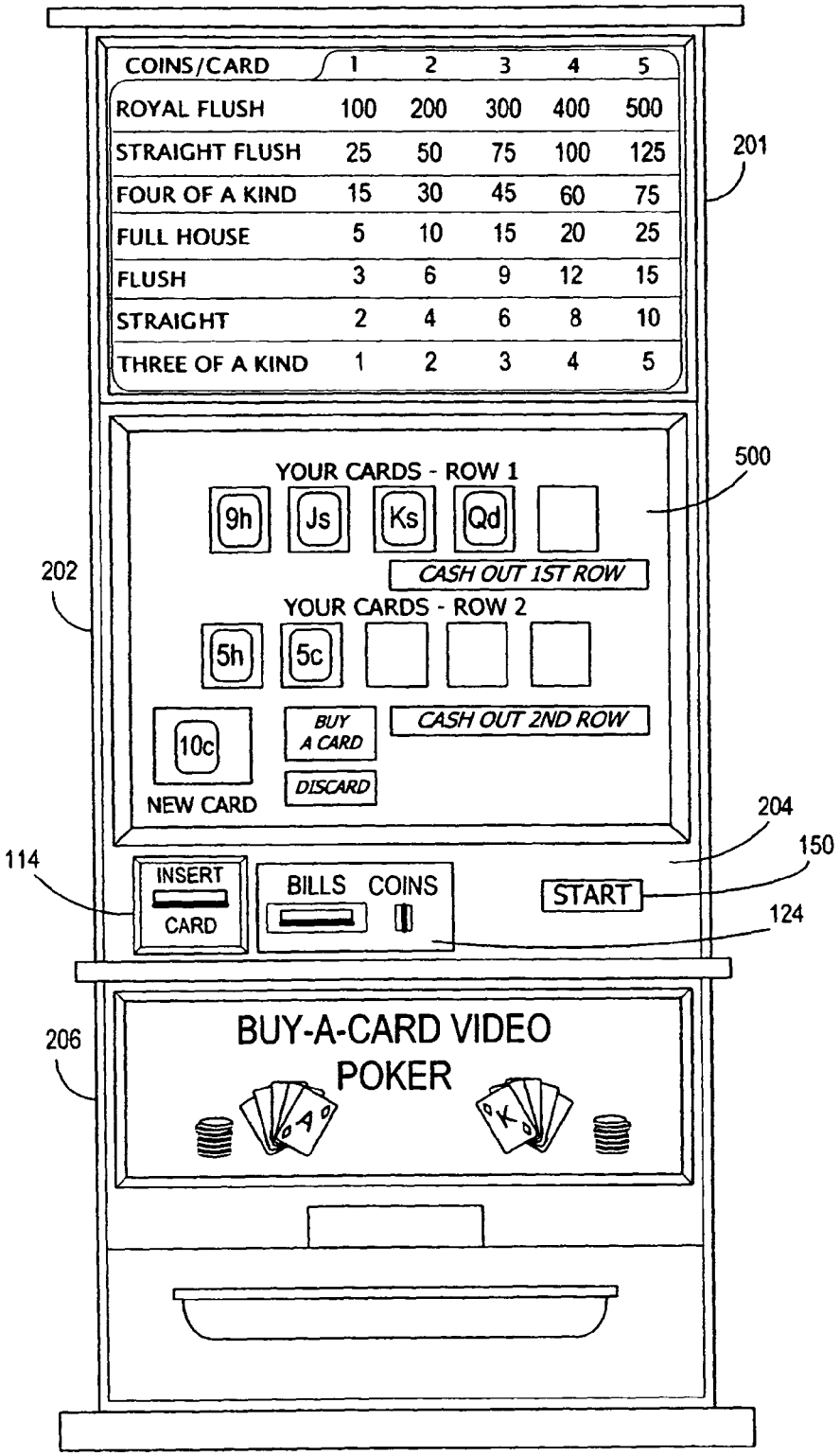
Figure 6:
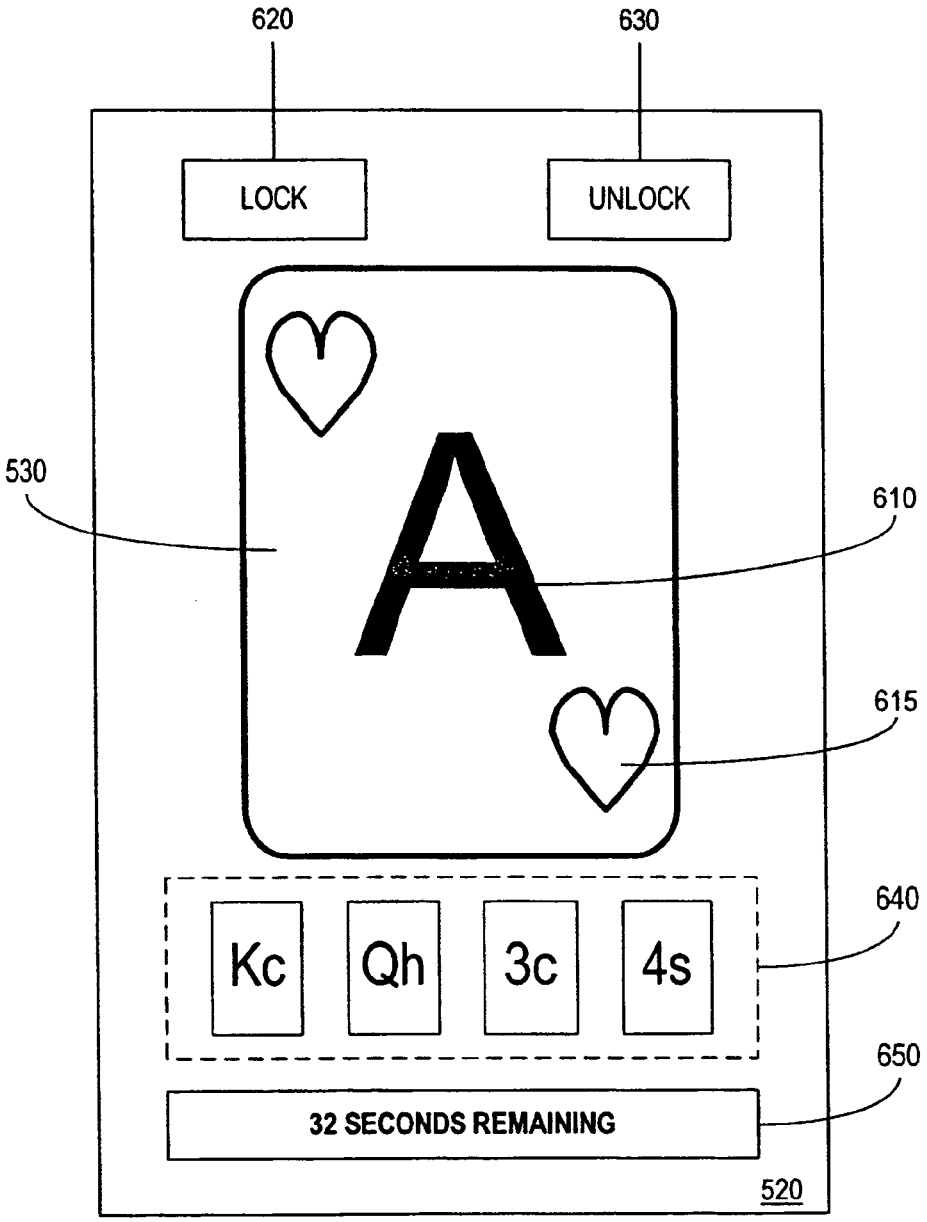
Figure 7:
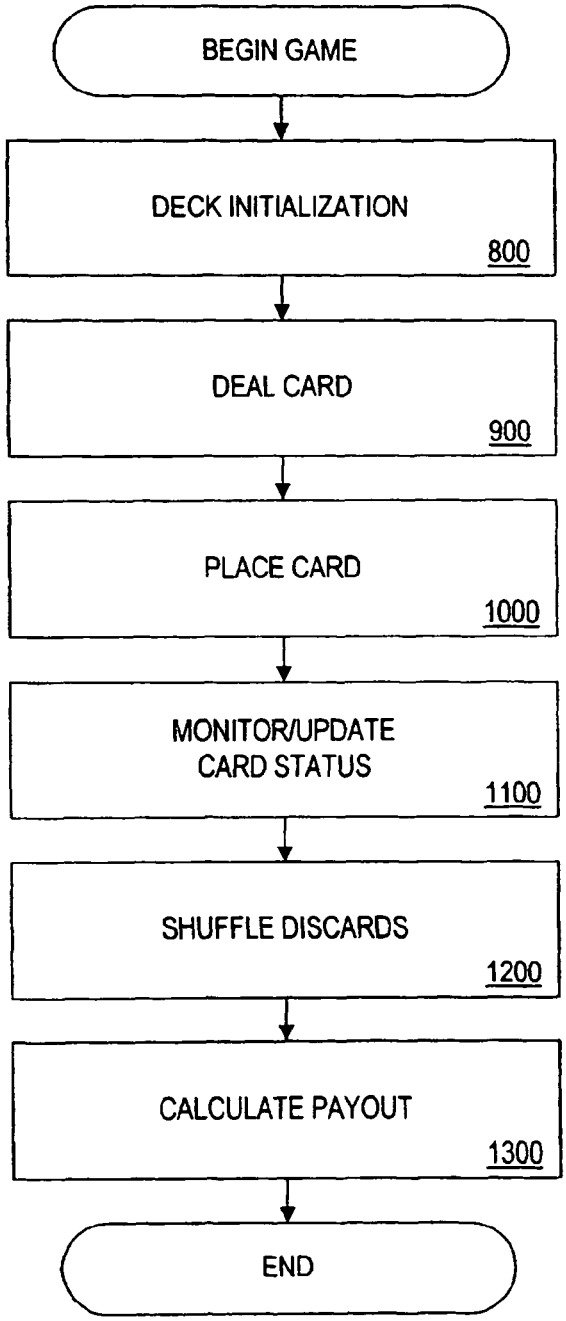
Figure 8:
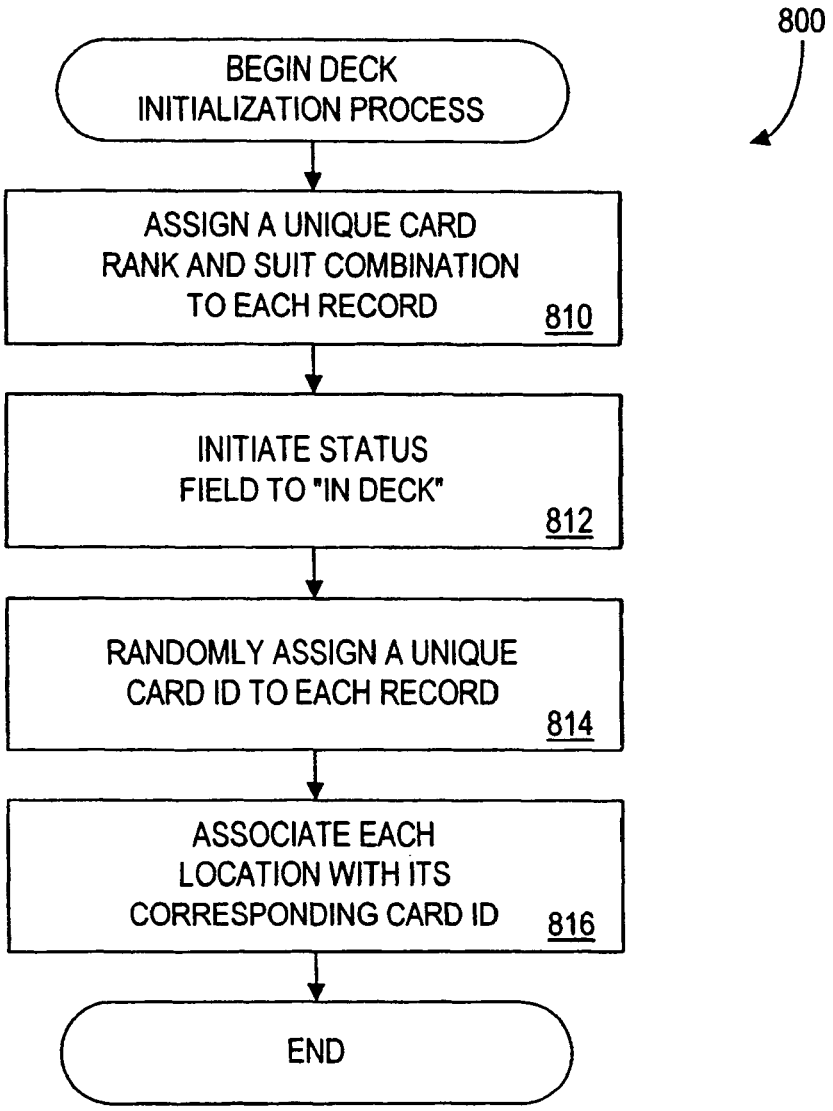
Figure 9:
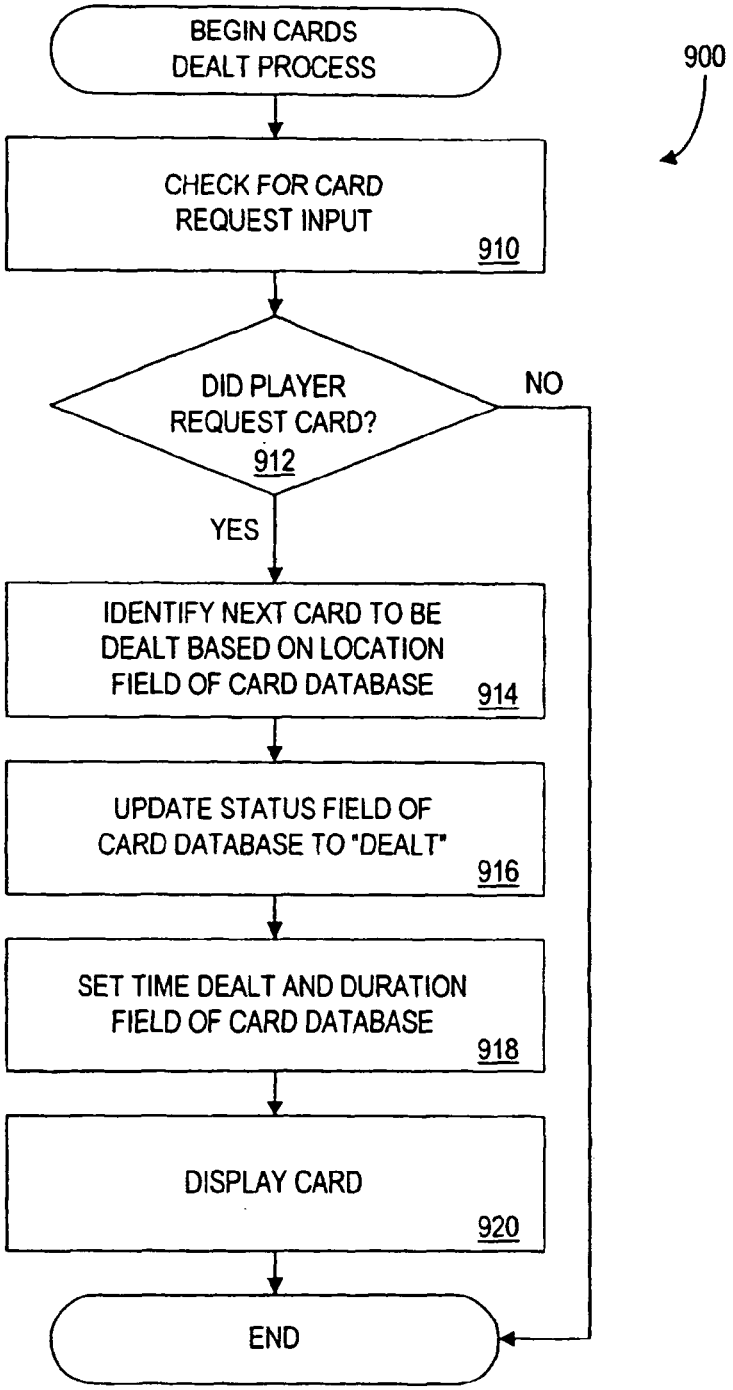
Figure 10:
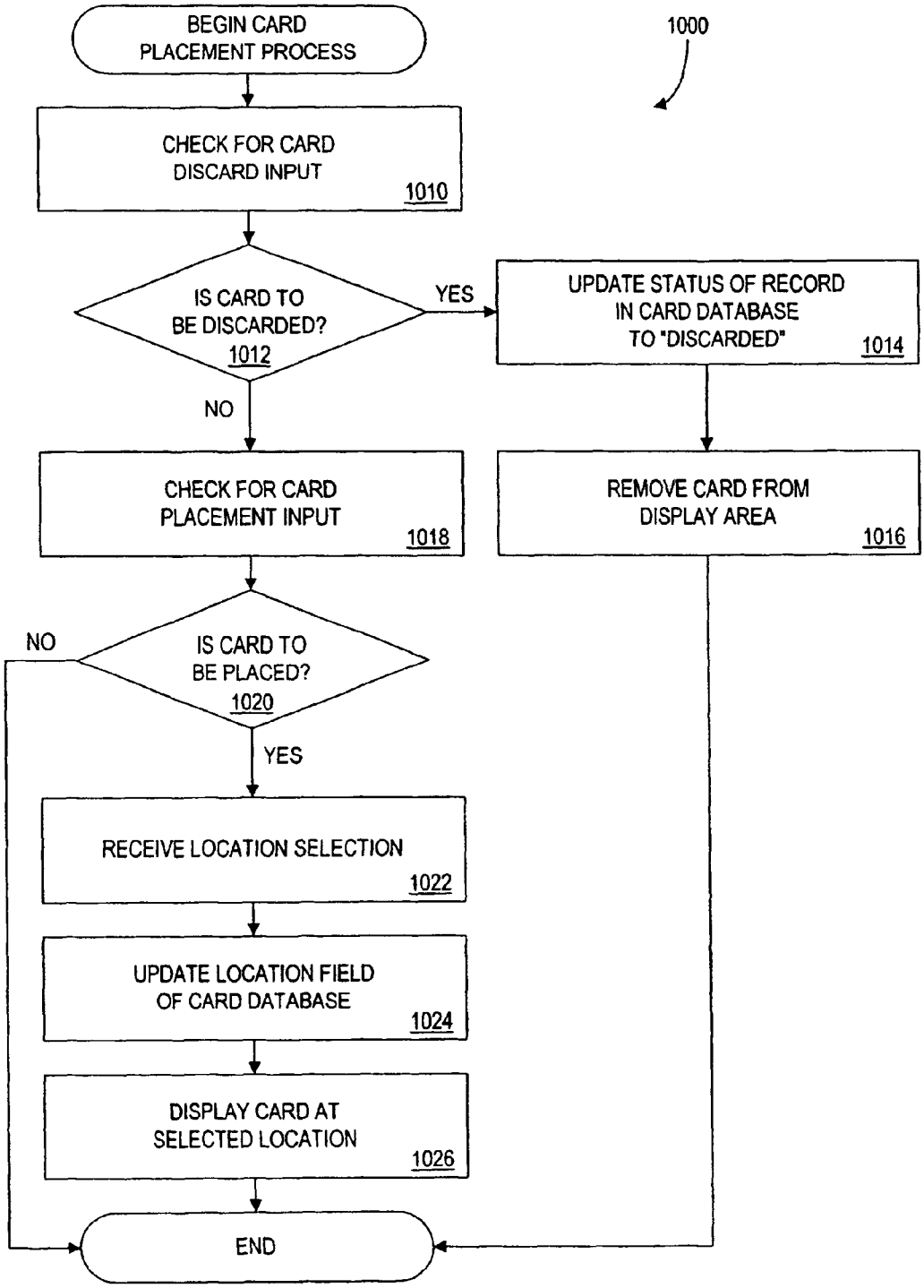
Figure 11A:
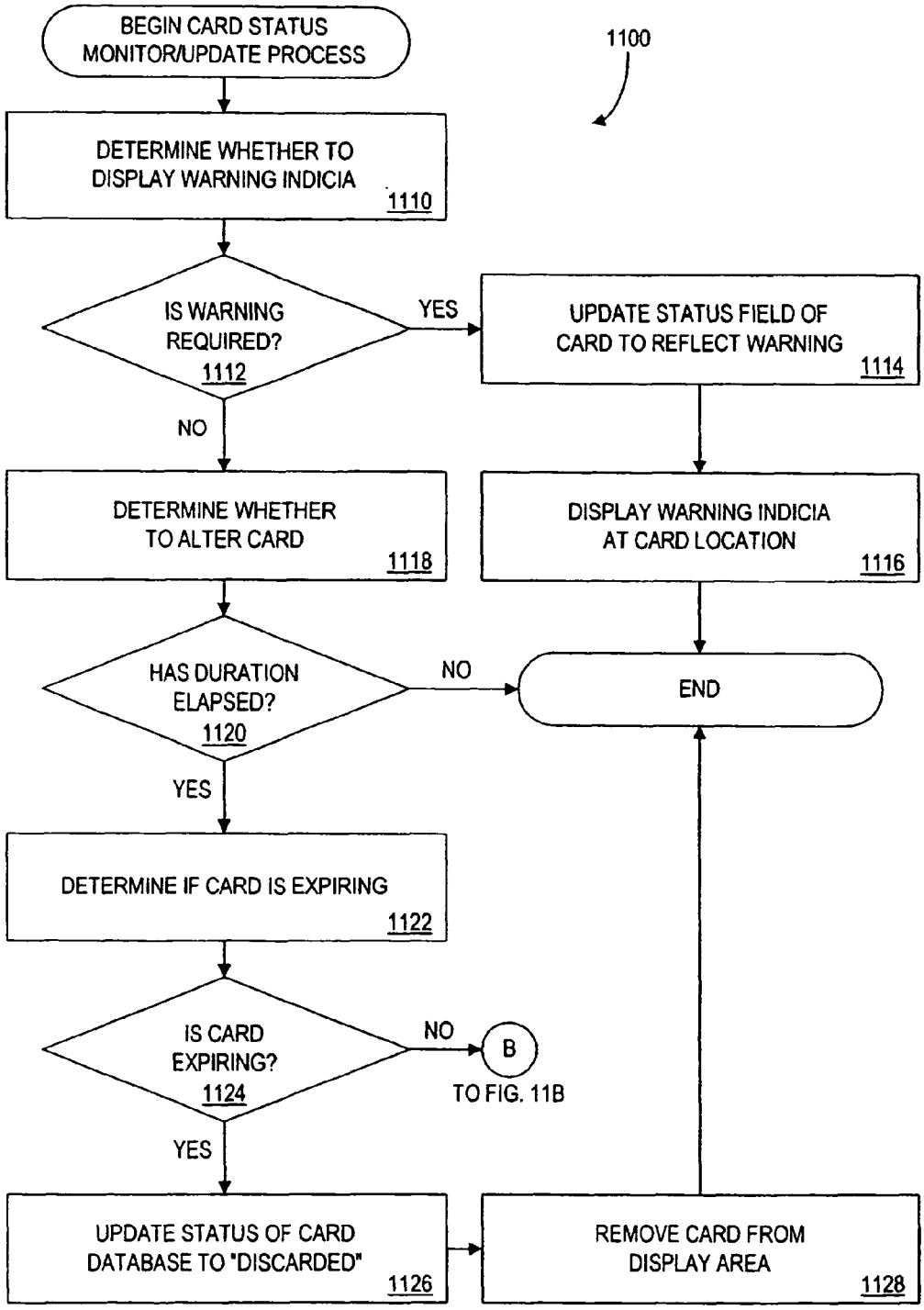
Figure 11B:
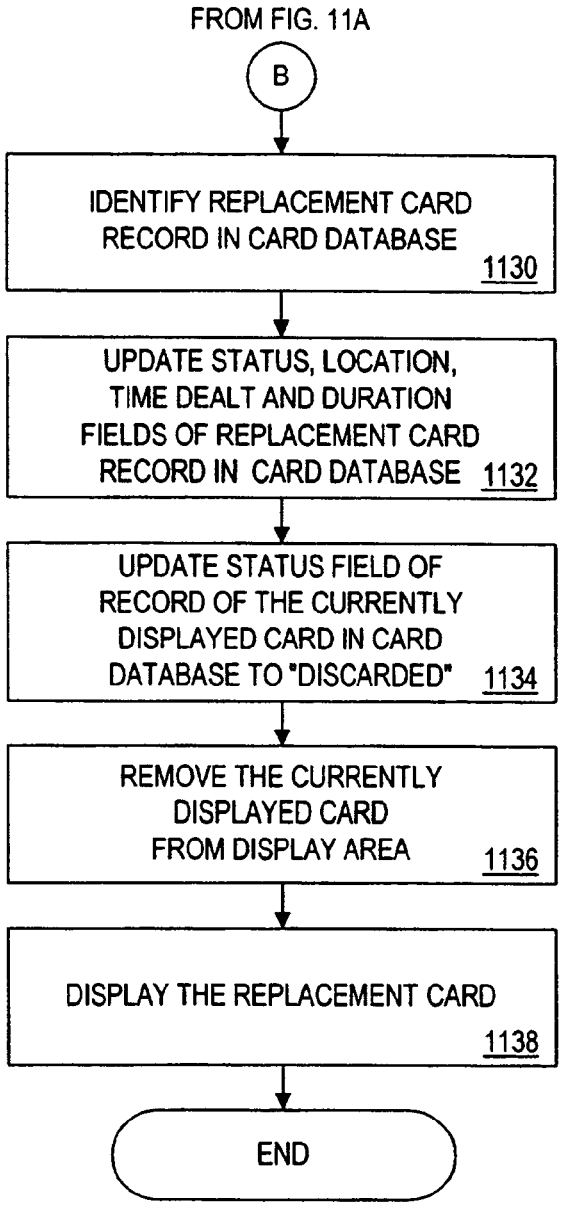
Figure 12:
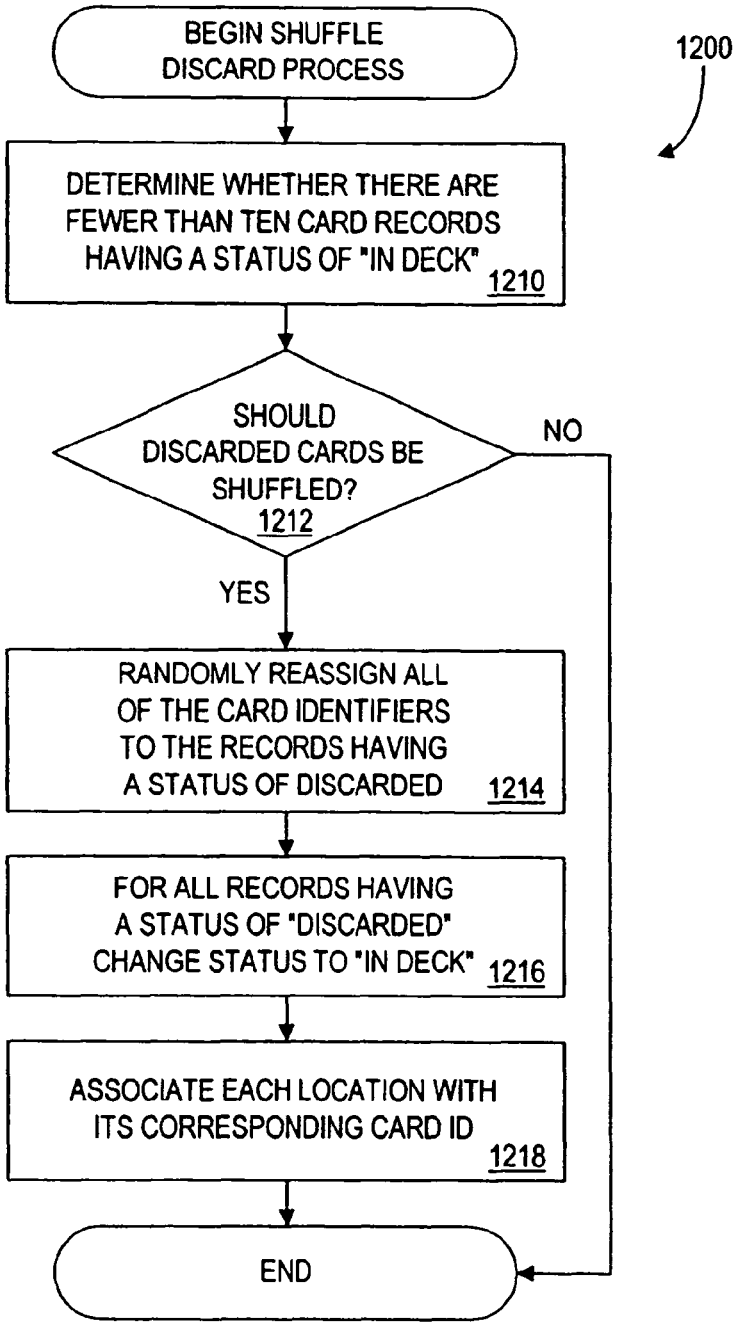
Figure 13:
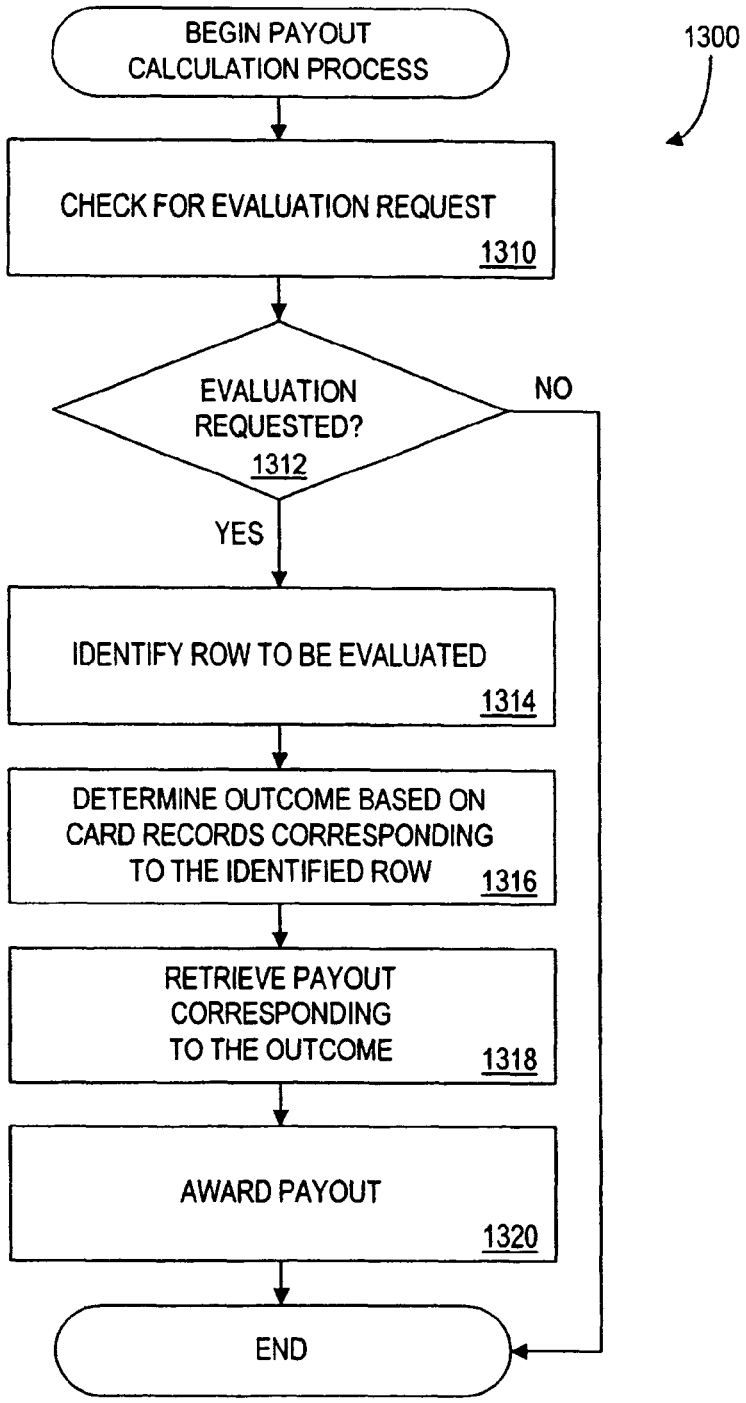
Figure 14:
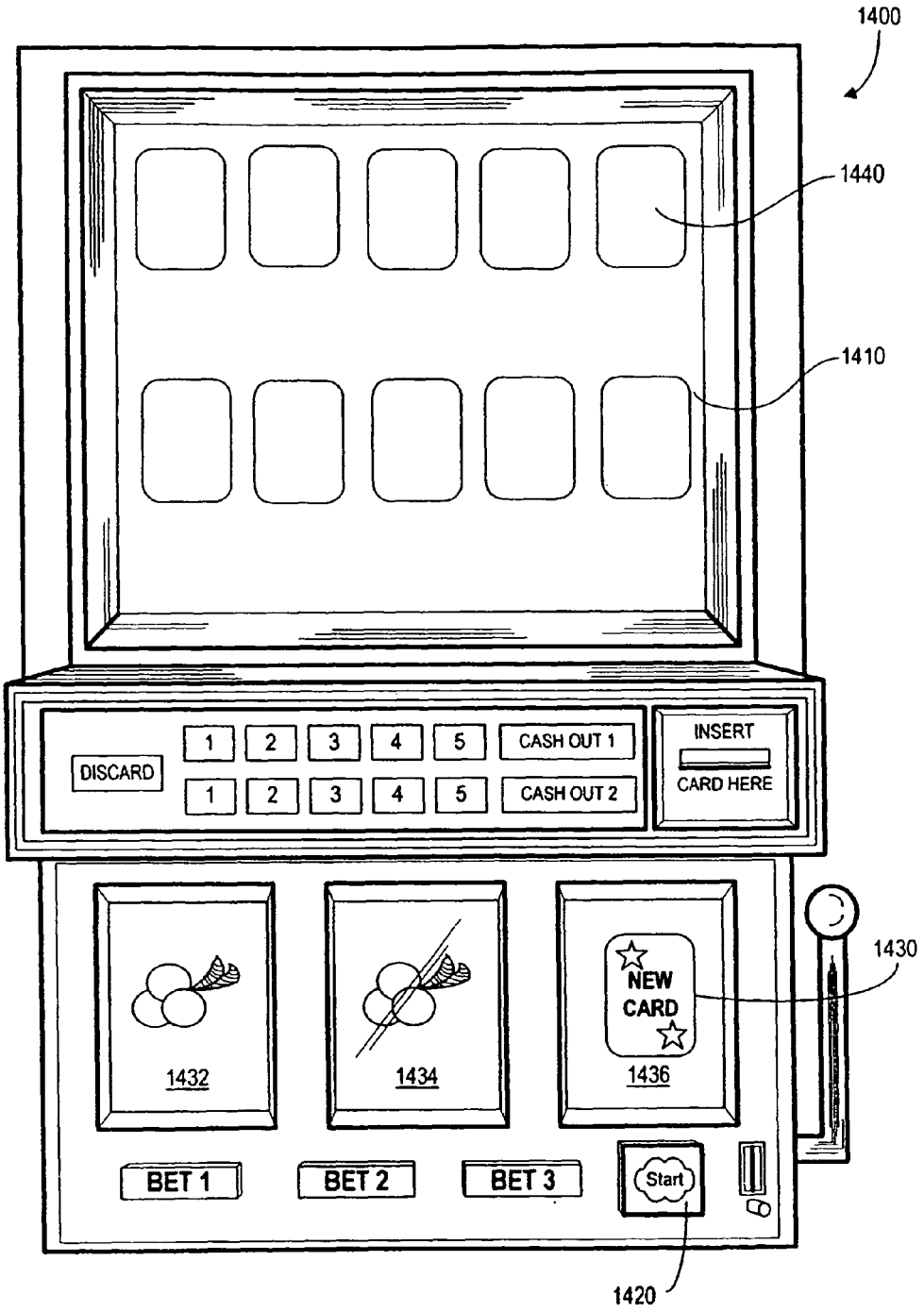

F1G. 2 is a table showing components of the payout database of FIG. 1;

FIG. 3 is a table showing components of the card database of FIG. 1;

FIG. 4 is a plan view of the gaming device of FIG. 1;

FIGS. 5A–5H together comprise sample screens from the video display of FIG. 4;

FIG. 6 is an illustration of the game element of FIG. 4;

FIG. 7 is a flowchart illustrating a method of operating a gaming device in accordance with the present embodiment;

FIG. 8 is a flowchart illustrating the deck initialization process of the present invention;

FIG. 9 is a flowchart illustrating the card dealing process of the present invention;

FIG. 10 is a flowchart illustrating the card placement process of the present invention;

FIGS. 11A–11B together comprise a flowchart illustrating the card monitoring and update process of the present invention;

FIG. 12 is a flowchart illustrating the shuffling process of the present invention;

FIG. 13 is a flowchart illustrating the payout calculation process of the present invention; and FIG. 14 is a plan view of an alternate embodiment of the gaming device of FIG. 1.

DETAILED DESCRIPTION OF THE INVENTION

Description of the System

In accordance with the present invention there is provided herein a gaming method and apparatus, illustrated by way of a video poker gaming device.

Referring now to FIG. 1, there is shown a block diagram of a gaming device 100 including a central processing unit (CPU) 102 and a data storage device 104 connected to the CPU. Further connected to CPU 102 are: a player card tracking device 114, a random number generator 112, a video display area 500, a hopper controller 122, a clock 106, a starting controller 150, and a coin/bill acceptor 124.

Gaining device 100 comprises conventional components, with the exception of card database 300. For purposes of better illustrating the invention, standard components, well known to those skilled in the art, are described only briefly. Although the present embodiment of the invention is described as implemented with physical components, the invention applies equally well to and includes software embodiments such as would be implemented on the Internet and other computer data networks.

Referring again to CPU 102, the device 100 comprises one of many well known processing units, for example a Pentium class CPU manufactured by Intel Corp. Data storage device 104 comprises an appropriate combination of magnetic and optical memory, such as disk drive memory, and semiconductor memory such as random access memory (RAM) and read only memory (ROM). In addition to payout database 200 and card database 300, data storage device 104 stores appropriate operating system and control software (not shown), functional to operate gaming device 100 in the manner described below. Random number generator 112 comprises one of many well known random or pseudo-random number generators suitable for use in a gaming device.

Coin/Bill acceptor 124 is operative to receive one or more coins or bills, and to transmit an appropriate value signal to CPU 102. Hopper controller 122, and hopper 130 connected thereto, are operative under the control of CPU 102 to dispense and output coins to a player. Video display 500 preferably comprises a touch sensitive screen capable of processing player selections through tactile interaction. Alternatively, video display 500 may comprise any conventional video display apparatus, for example, a cathode ray tube or a liquid crystal display screen.

Starting controller 150 comprises a player-operated device such as a handle or button for initiating the play of a game.

Player card tracking device 114 comprises a player tracking interface including a card reader 138 for receiving a player tracking card, a display 142 for communicating alpha/numeric messages to the player, and a keypad 140 for receiving player input such as a player identifier.

Gaming device 100 may include a conventional network interface (not shown) for communicating with a centrally controlled network server, allowing for the remote monitoring and audit of gaming device 100.

Payout database 200 comprises a conventional payout database such as those found in most video poker machines. The database serves to associate a particular outcome or hand value, such as a full house, with a particular coin payout based on the number of coins wagered. Payout database 200 is shown to include ten records 232 through 250, each of which includes two fields: an outcome field 210 and a payout field 220. The final poker hands represented in outcome 210 illustrate conventional poker rankings typical of a video draw poker game. Record 238, for example, indicates an outcome of "FULL HOUSE" which includes all hands with both three of a kind and two of a kind. Other hand rankings, such as those incorporating jokers, wild cards, or specific card bonuses are, of course, also within the scope of the present invention.

The profitability of the game for the casino is directly related to the values stored in payout field 220, although player skill levels will also have an impact. Payouts 220 might be set so that the casino retains some advantage, even in the face of expert play. Record 238, for example, indicates a payout of five dollars associated with an outcome of "FULL HOUSE." Although the payouts of payout field 220 represent the wager of a single coin for each card purchased, additional fields could be added to allow multiple coin wagers as illustrated in FIG. 4 below. The values shown in payout field 220 are merely illustrative and are not intended to limit the scope of the invention.

Referring now to FIG. 3, there is described card database 300 shown to include five records 340, 342, 344, 346, and 348, each of which includes seven fields: card identifier 310, rank 312, suit 314, status 316, location 318, time dealt 320, and duration 322. This database serves to monitor and update a deck of fifty-two cards, each card having a unique rank/suit combination, or class, as implemented in the present invention. Card identifier 310 uniquely identifies each card, and may be a number from one to fifty-two for each card of a standard deck of cards. Such a numeric identifier simplifies the card manipulation operations as described in more detail with reference to the figures below. Rank 312 identifies the rank of the card and contains the standard deck values of ace, deuce, three, four, five, six, seven, eight, nine, ten, jack, queen, and king. Rank 312 could of course also store non-standard ranks such as wild card, joker, or other bonus type card values. Instead of storing the rank description, rank 312 could simply store numeric identifiers which were associated with descriptions stored in ROM. The suit of each card is stored in suit 314 and may include conventional suits such as hearts, clubs, spades, and diamonds. Record 344, for example, indicates a card with a rank of "J" (a Jack) and a suit of clubs. Wild cards could include a fixed rank with any suit, or a fixed suit with any rank. A suit-wild Jack, for example, might represent either the jack of clubs, jack of diamonds, jack of hearts, or jack of spades.

Although the present embodiment identifies the use of a standard fifty-two card deck with one card of each rank and suit, it should be noted that some card values may be over or underrepresented. Thus, for example, there may be fewer royal cards (ten, jack, queen, king, and ace) and a correspondingly larger number of low value cards. Such an arrangement has the advantage of decreasing the probability that a player attains a royal flush, allowing the machine to offer a higher payout for such a final hand configuration.

The status of each card is stored in status 316, with values indicating where the particular card is within the game cycle as described more fully with reference to FIGS. 7 to 13 below. Cards are initially assigned a status of "IN DECK" to indicate that they are ready to enter game play. Once a card has been dealt it is described as "DEALT" and is displayed to the player in video display 500. Discarded cards have their status changed to "DISCARDED" while cards placed into play maintain their "DEALT" status. After a predetermined amount of time, "DEALT" cards change to "FIRST ALTERATION WARNING," a status which indicates that the card will soon change into another card value, with a corresponding change in status to "FIRST ALTERATION." Associated with such a status change is a change in rank or suit as described more fully with reference to FIG. 11 below. A "FINAL ALTERATION WARNING" and "FINAL ALTER- ATION" status correspond to a second alteration of the card's rank and/or suit. Finally, the card may have a status of "EXPIRATION WARNING" to indicate that the card is about to expire and return to the discarded cards queue.

Each card has a corresponding location 318 in order to facilitate tracking of cards throughout the operation of the present invention, identifying either where the card is in the queue prior to being dealt, where the card is in the discard pile, or where the card has been placed by the player. Record 340, for example, indicates that the card is currently scheduled to be the fifth card dealt.

In order to manage the timing requirements of the present invention, card database 300 includes the fields time dealt 320 and duration 322. As each card is dealt to the player, CPU 102 retrieves the current time from clock 106 and updates the time dealt field to indicate the current time. This allows CPU 102 to calculate how long the card has been exposed to the player so that future alterations may be made. Duration 322 indicates the amount of time that is to elapse before the next card alteration. Record 348, for example, shows a time dealt of 09:03:22 (hours/minutes/seconds) with a 120 second window before the card changes.

Referring now to FIG. 4, a plan view is shown of gaming device 100 of the present invention which, for purposes of discussion, is generally divided into three sections: an upper panel 201, a display panel 202, an interface panel 204, and a lower panel 206. Upper panel 201 includes a pay table comprising, for example, pay amounts corresponding to various draw poker hands. These values correspond to those shown in the payout database 200 of FIG. 2, and may be printed on glass with a back lighting scheme for maximum player visibility. Display panel 202 contains display area 500 which displays the card values to the player and acts as the player interface through the above described touch screen functionality. The elements of display area 500 will be described more fully with reference to FIG. 5A below. Interface panel 204 houses starting controller 150, player tracking device 114 (including card reader 138, keypad 140, and display 142 shown set to read "INSERT CARD") and coin/bill acceptor 124. Lower panel 206 includes promotional messages which may serve to attract players to the game, or to provide rules/instructions concerning operation of the game.

In order to more fully describe the display area 500 of the present invention, reference is made to FIGS. 5A–H which illustrate an exemplary game play of the present invention.

Figure 5A:
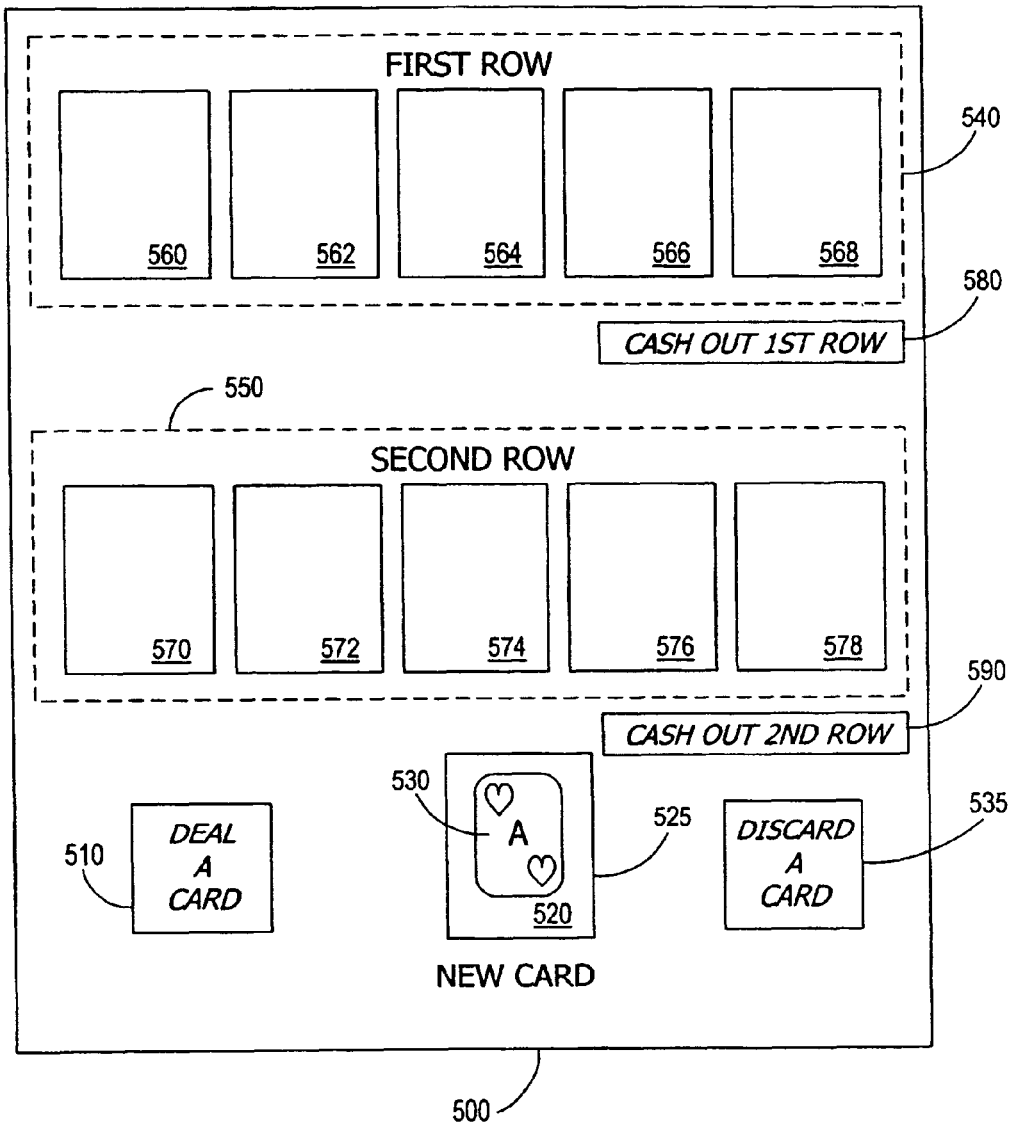

FIG. 5A shows an enlarged view of the display area 500 of FIG. 4. This area is electronically displayed to the player and changes during the course of the game as described in more detail below. Game element signal request generator 510 labeled "DEAL A CARD" ("deal button") is used by the player to request another card, and is associated with the payment of one or more credits. Players touch the screen at this location, providing a signal to CPU 102 that another card has been requested. Location 520 is the area of display 500 ("screen") that displays cards which have been requested via deal button 510. The requested game element 525 ("card") in this embodiment is an electronic representation of a conventional playing card, and has a corresponding attribute 530 which identifies the rank and suit of the card. In the example shown in FIG. 5A, the attribute 530 value is a rank of ace and a suit of hearts.

Players may choose to discard a dealt card by touching the discard button 535 labeled "DISCARD A CARD," transmitting a signal to CPU 102 to initiate further processing of the card as described more fully in FIG. 10 below. Cards that are not discarded are placed within either game set 540 or game set 550. Game set 540 incorporates five card locations 560 through 568, each capable of displaying a particular game element 525. Game set 550 contains five card locations 570 through 578, with similar display capabilities. Players request to "cash-out" a particular game set 540 or 550 by pressing an evaluation signal generator 580 or 590 ("cash-out button"), respectively. Such a cash-out process is performed after the player has accumulated one or more cards 525 within a particular game set 540 or 550, with the cards 525 qualifying for a payout as indicated by payout field 220 of payout database 200.

Figure 5B:
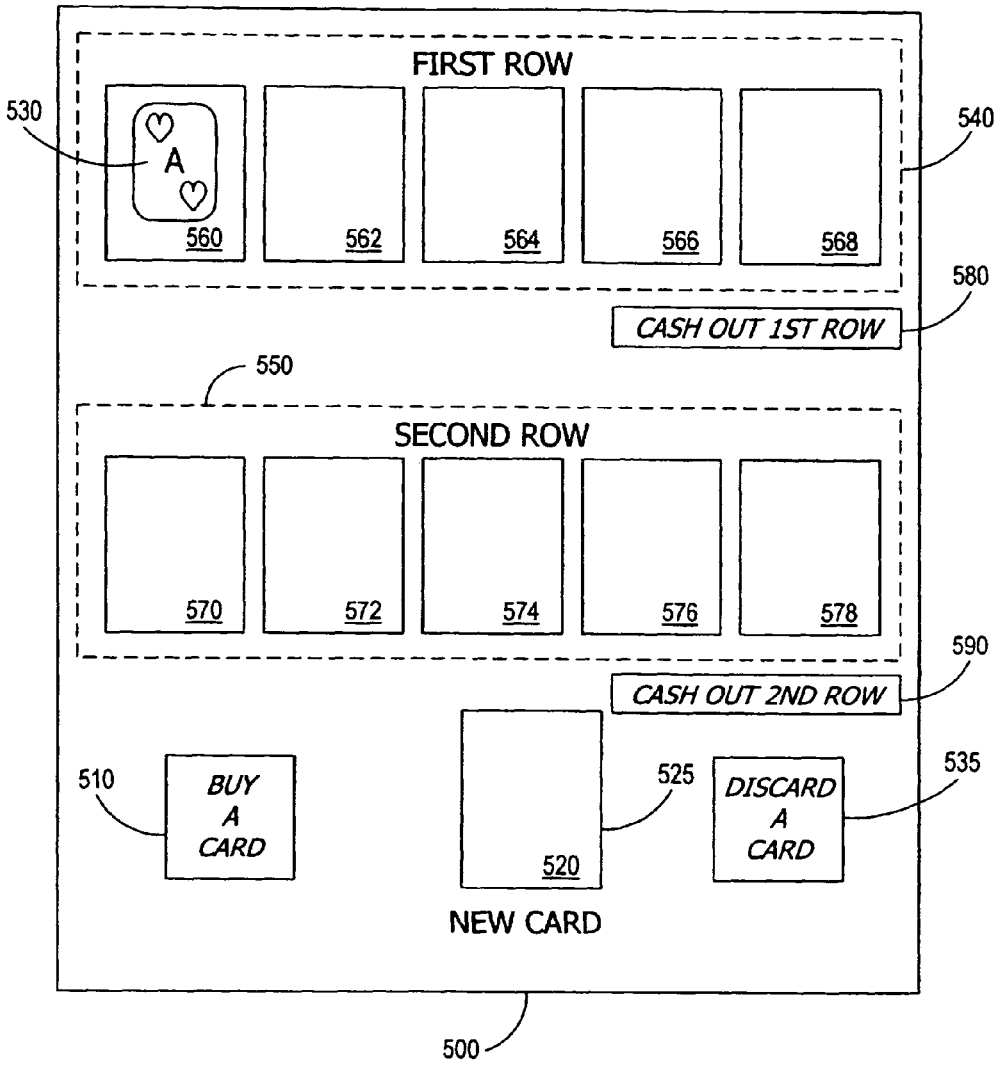

In the example illustrated in FIG. 5A, the player is dealt an ace of hearts as card 525, and must decide what to do with the card. FIG. 5B illustrates the changes to display 500 which reflect the decision to place card 525 in location 560 of game set 540. The electronic representation of the ace of hearts is deleted from location 520 and then appears at location 560, responsive to the player indicating the location by touching the screen at location 560 thereby initiating a placement signal. At this point, the player is ready to request another card be dealt by touching deal button 510. In an alternative embodiment, some cards 525 may be restricted to certain game sets 540 or 550. For example, royal cards might be restricted to game set 540. Cards 525 could also be restricted to an individual location, with the ace of spades restricted to location 560, for example.

Figure 5C:
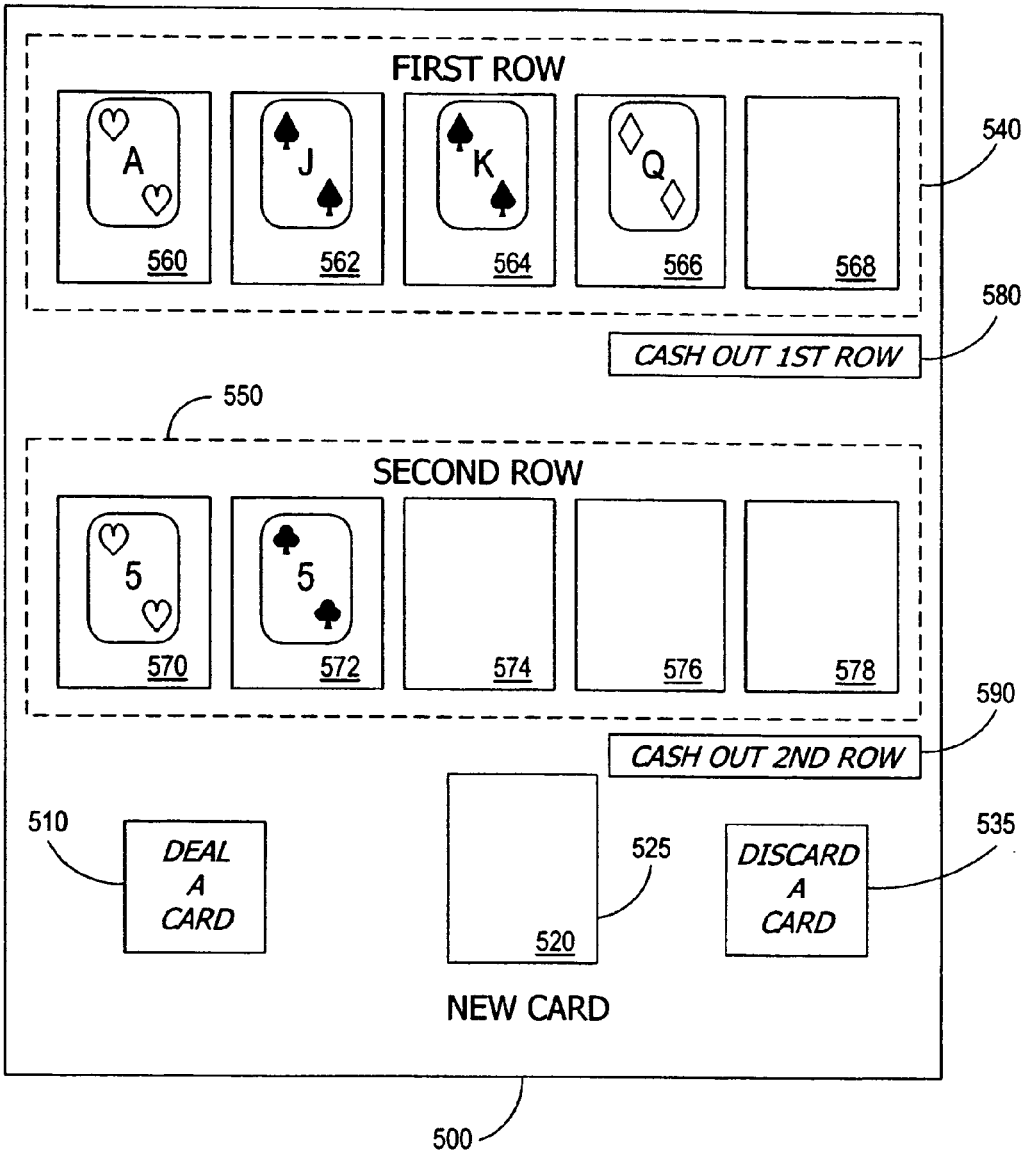

FIG. 5C shows a later stage of the game in which the player has placed cards 525 in game set 540, specifically locations 560 (ace of hearts), 562 (jack of spades), 564 (king of spades), and 566 (queen of diamonds). Location 568 shows no card 525 and is thus available to the player for future card placement. With four cards to the straight, the player may request cards 525 to be dealt in an effort to complete the straight with a ten of some suit. Such a hand, if cashed-out via cash-out button 580, would receive a payout of two coins as shown for record 242 of payout database 200. Game set 550 has been populated with only two cards 525—location 570 (five of hearts) and 572 (five of clubs). The remaining three locations are available for additional cards. In this case, the player might be hoping for two more fives to complete a four of a kind, or for one more five to complete a three of a kind.

Figure 5D:
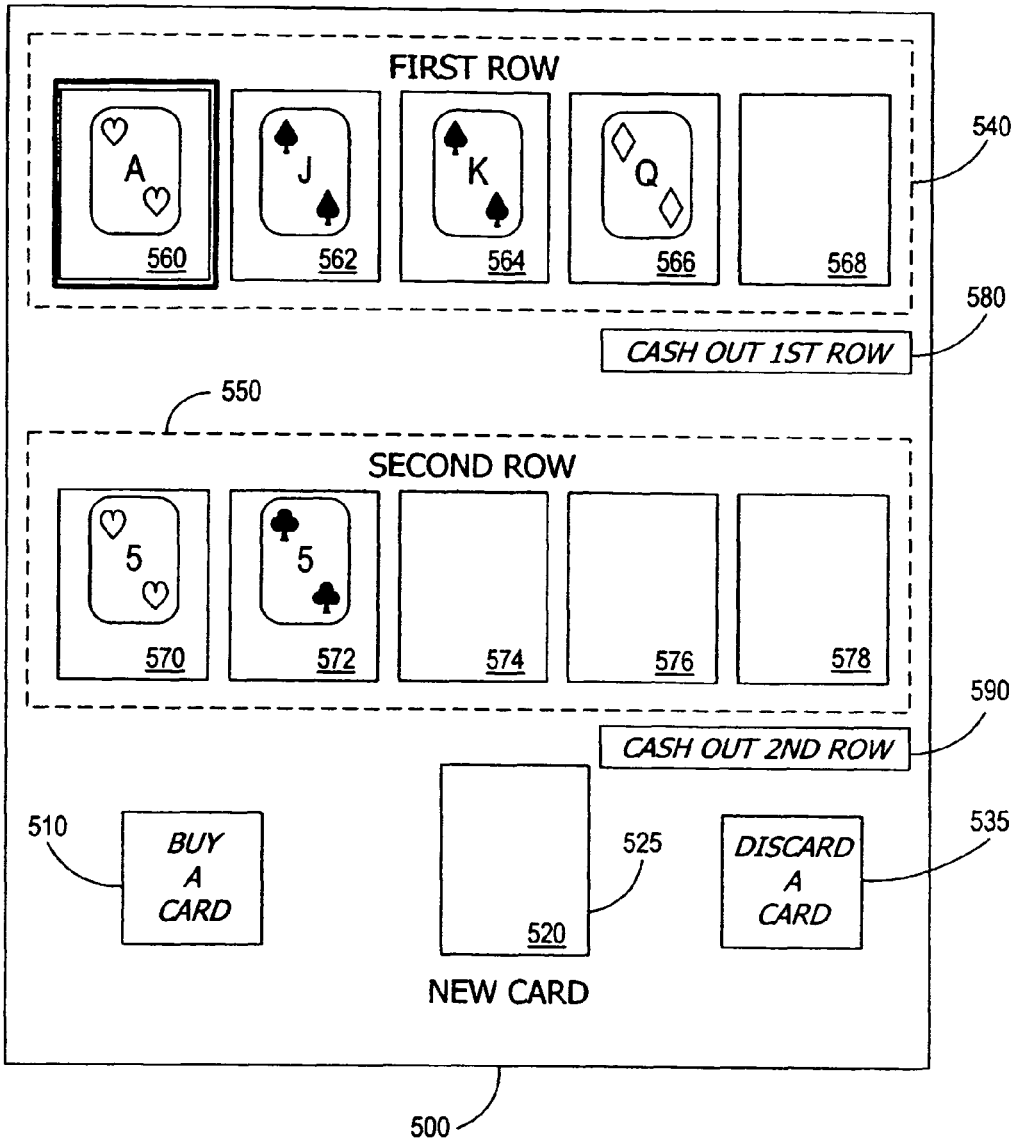
Figure 5E:
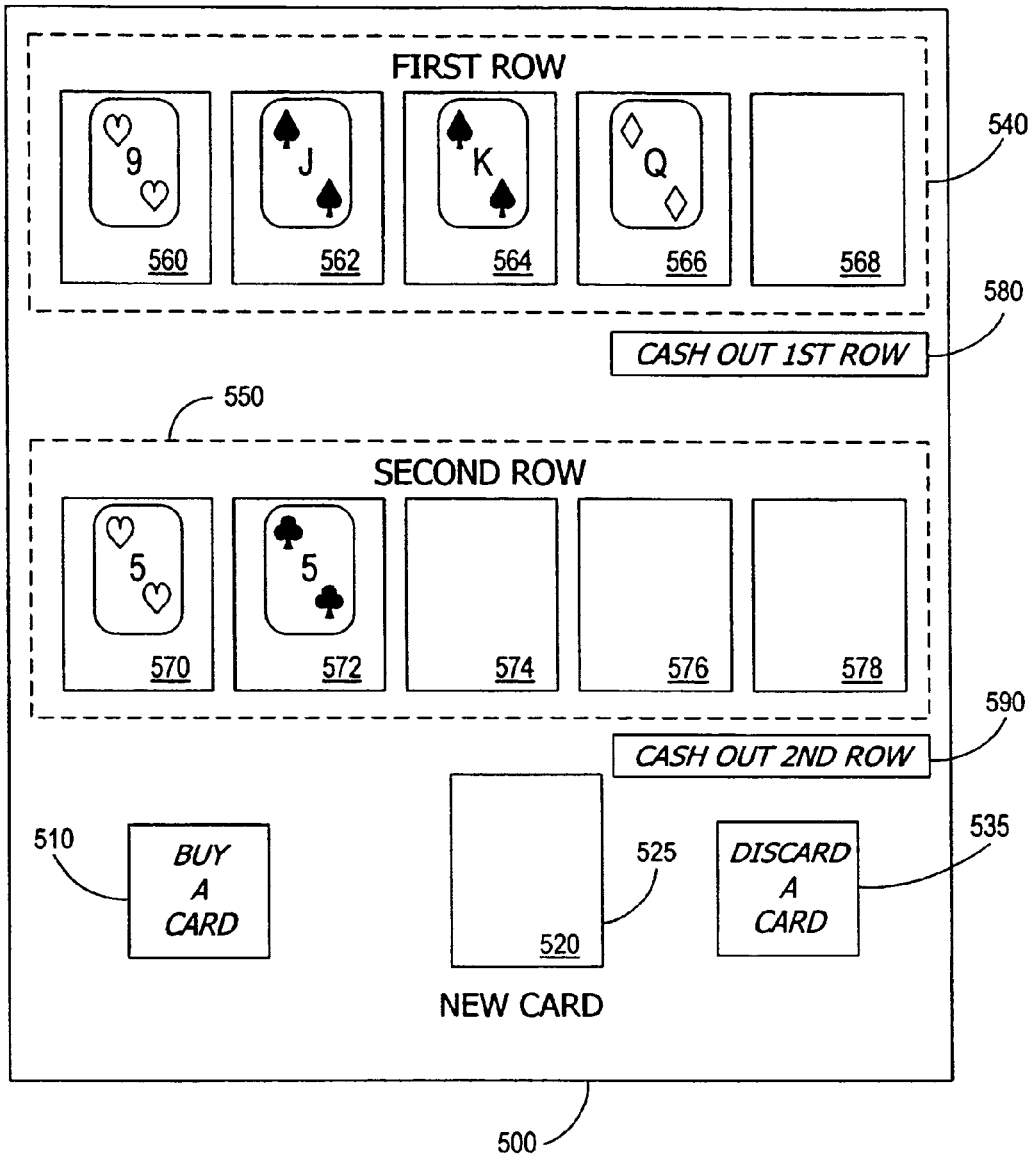

FIG. 5D illustrates the time element of one embodiment of the present invention in that one of the cards 525 is indicating that it is about to change. Location 560 is highlighted as a warning to the player that the card is about to change to another rank or suit. The highlighting effect might take the form of a border that flashes, a color change, or a resizing of the card. Any mechanism sufficient to attract the attention of the player is sufficient. In one embodiment, location 560 remains the same visually but is accompanied by an audible warning. FIG. 5E shows display 500 after the card 525 in location 560 has changed rank. In this example, the ace of hearts has been replaced with the nine of hearts. Various protocols may be used in determining the value of the replacement card. The changed value could be determined in advance, assigned randomly, increased in sequence (e.g. cards always increase in rank and change from clubs to hearts to diamonds to spades and back again), decreased in sequence, etc. Some cards could increase while others decreased. Instead of changing value, the card could simply change location, moving from one game set to another.

Figure 5F:
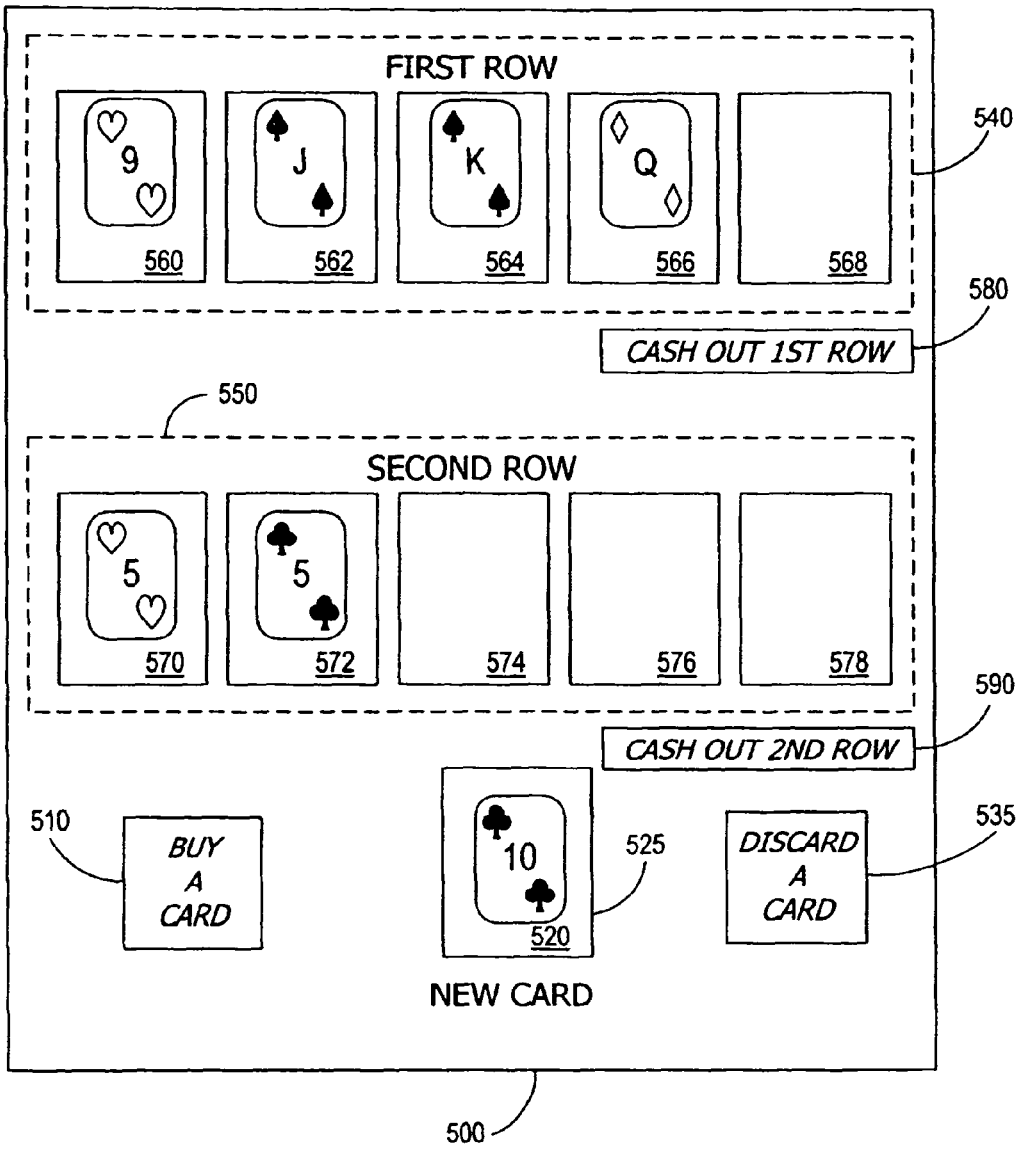
Figure 5G:
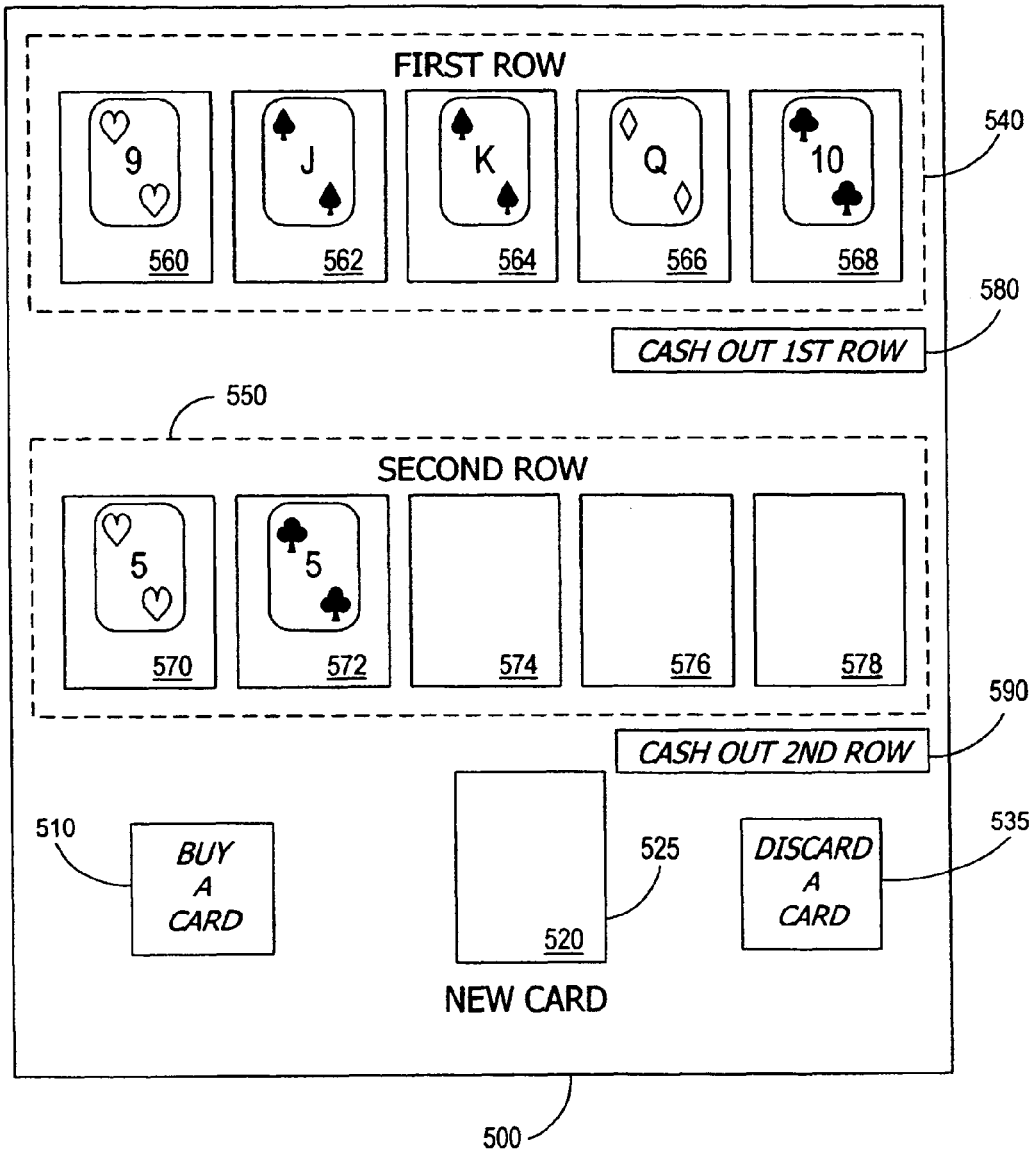

After requesting another card by touching deal button 510, the player receives a ten of clubs as shown in FIG. 5F. Although this card could be discarded or placed within game set 550, the player has noticed that the four existing cards 525 of game set 540 are missing only a ten in order to complete a straight, so the player selects this location by touching location 568 of game set 540. The ten of clubs is then deleted from location 520 and placed into location 568, with the result shown in FIG. 5G. Having achieved a straight in game set 540, the player decides to receive payment by touching the cash-out button 580, which transmits a signal to CPU 102 to initiate the payment process as described in more detail with reference to FIG. 13 below. Note that the player is encouraged to act quickly as the remaining cards 525 in locations 562 through 568 may change to other ranks or suits, either eliminating the straight or reducing the hand to a lower payout outcome such as a pair of kings. In rare cases, correct strategy might in fact be to wait for cards to change. A player with a game set including the ace, king, queen, and jack of spades along with a ten of clubs would have a straight and could cash-out for the value of a straight. If the ten of clubs were the next card to change, however, the player might wait in the hopes that the card changed suit to spades—completing the royal flush.

Figure 5H:
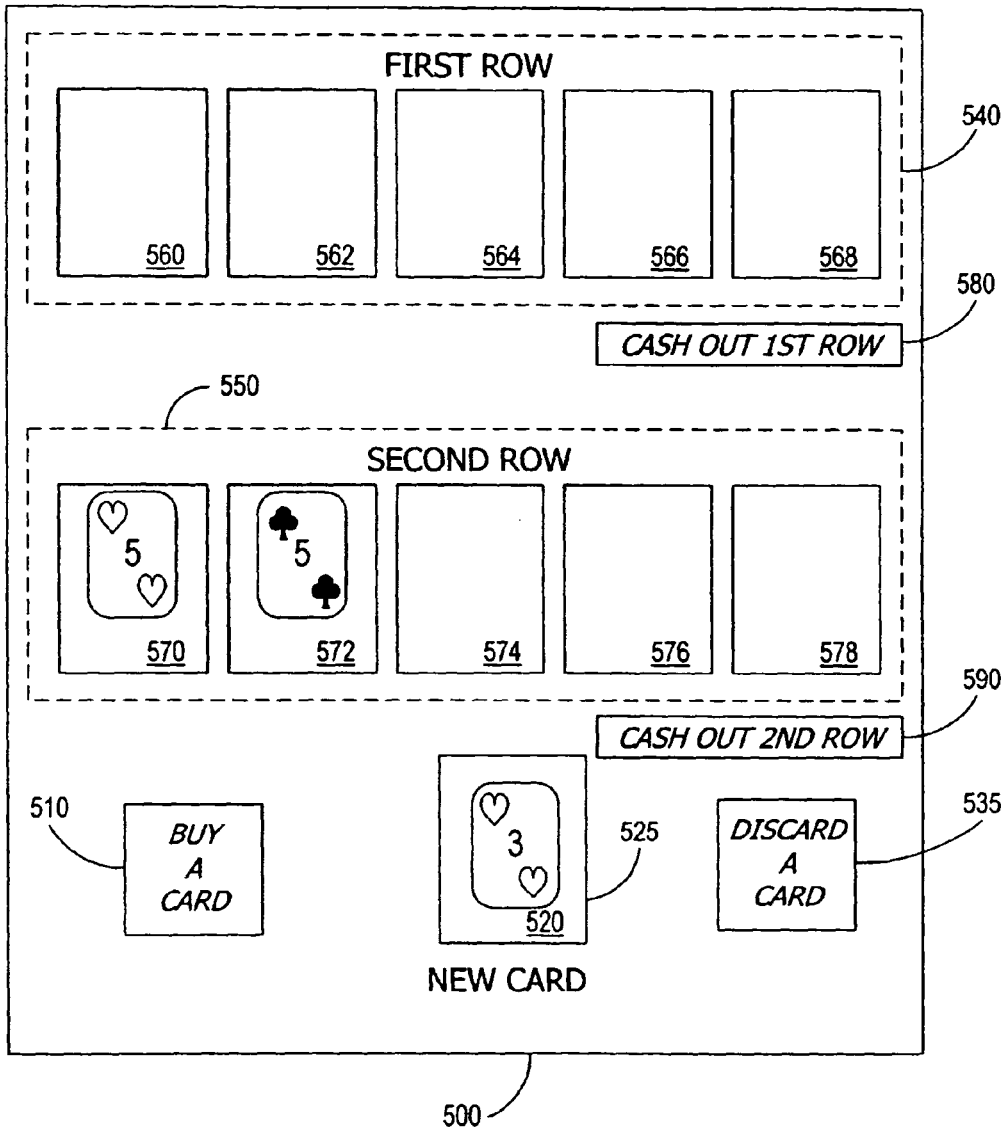

After receiving appropriate credit, all of the locations in game set 540 are cleared so that new cards 525 can be placed into them, as illustrated in FIG. 5H. The player has requested another card 525 and has received the three of hearts as shown in location 520. Once again, the player faces the choice of discarding this card or placing it into one of the two game sets.

Referring now to FIG. 6, there are shown several alternate embodiments of a card 525 in location 520, with a rank 610 of ace and a suit 615 of hearts. In one embodiment, the card has a lock button 620 and an unlock button 630. Lock button 620 is engaged by a touch from the player and serves to prevent the card from changing values. Such a lock might apply to either the rank 610 or the suit 615, or to a combination of both. A limit of one locked card per game set could be imposed, or the player could be charged one or more credits for the privilege of locking the card. In another embodiment, the locking process only serves to extend the duration of the card, or merely prevents the card from disappearing entirely. In embodiments where the number of locked cards is limited, unlock button 630 would allow players to switch the selection of which card is to be locked. In an alternative embodiment, the player is able to lock a series of one or more cards at the same time, such as by specifying a column of cards (e.g. the third location of each game set).

Card display 640 enables players to view the rank and suit that the card is scheduled to change into. In the example illustrated, the ace of hearts will turn into the king of clubs, the queen of hearts, the three of clubs, and finally into the four of spades. Such advance warning would allow players to more appropriately place their cards, although it would require relatively skillful play to coordinate the timing of the changes. In order to improve the player's timing efforts, a countdown display 650 could be located on each card 525 to show the number of seconds before the next scheduled card change.

Although the embodiment described above receives player input via touch screen capability, those of ordinary skill will appreciate that such player requests may be made via physical buttons as well. In particular, each location 560 through 568 and 570 through 578 could be identified with the numerals 1 through 5 and 6 through 10, corresponding to ten like numbered buttons of gaming device 100. A player who wanted to place a card 525 in location 576 would thus depress the physical button labeled nine. Such buttons could also be associated with a particular row, such as by labeling the button "FIRST ROW SECOND POSITION," for example. Similar physical representations could be made for deal button 510, discard button 535, cash-out button 580, and cash-out button 590.

Description of the Operation

Having thus described the architecture of the gaming apparatus and components of the present embodiment, the operation of the apparatus will now be described in greater detail with reference to FIGS. 7–13 and continuing reference to FIGS. 1–6. It is to be understood that the software instructions necessary to provide the functionality described herein are preferably stored in storage device 104 of gaming device 100.

Referring now to FIG. 7, a flowchart is depicted illustrating the major routines or processes executed by gaming device 100 during a typical game. At the beginning of a game, CPU 102 processes a deck initialization routine 800. Deck initialization routine 800 randomly arranges the cards of a standard deck of fifty-two playing cards. This process simulates the shuffling of a standard deck of fifty-two playing cards.

CPU 102 processes routines 900, 1000, 1100, 1200 and 1300 in an iterative fashion throughout the game. Deal card routine 900 deals a new card to the player upon request. Place card routine 1000 allows a player to place a dealt card in a location within display area 500. Place card routine 1000 also processes a player request to discard a card. Monitor/update card status routine 1100 instructs CPU 102 to maintain the cards that have been placed by or dealt to the player. The instructions of monitor/update card status routine 1100 determine when and how to alter the cards on the playing field.

Shuffle discards routine 1200 instructs CPU 102 when and how to shuffle the cards that have been discarded either explicitly by the player or automatically through the alteration of placed cards. Calculate payout routine 1300 instructs CPU 102 how to evaluate a hand upon the player's request. Calculate payout routine 1300 includes instructions for evaluating an identified hand, determining a corresponding payout amount and delivering the payout amount to the player.

Referring now to FIG. 8, a flowchart is presented depicting the process steps of deck initialization routine 800. Deck initialization routine 800 initializes the records of card database 300 to simulate the shuffling of a standard deck of fifty-two playing cards. At step 810, CPU 102 is instructed to assign a unique card rank and suit combination to each record. This is accomplished by initializing card rank field 312 and suit field 314 of every record so that every record is defined to represent a different card in a standard fifty-two card deck. At step 812, CPU 102 is instructed to populate status field 316 of every record with data indicating that every card is "IN DECK." At step 814, CPU 102 is instructed to populate card identifier field 310 of each record with a randomly generated, unique card identifier. Preferably, card identifiers are numbers between 1 and 52. At step 816, deck initialization process 800 instructs CPU 102 to populate each location field 318 with the contents of the corresponding card identifier field 310. This indicates each card's relative location within the shuffled deck of cards.

Referring now to FIG. 9, a flowchart is presented depicting the process steps of deal card routine 900. Generally, deal card routine 900 determines when to deal a card to the player, selects a record from card database 300 representing the card to be dealt, and displays the card to the player. At step 910, CPU 102 is instructed to check for a card request signal from the player. The card request signal is generated by a player touching deal button 510 on video display 500, and may be checked by polling for an input or receiving a hardware interrupt. At decision step 912, CPU 102 is instructed to end the routine if a card request signal is not received. In the event a card request signal is received, CPU 102 processes step 914 and identifies the record representing the next card to be dealt. Step 914 may be accomplished by maintaining a pointer to the next card to be dealt. Alternatively, step 914 may be accomplished by searching location field 318 of card database 300 for the record having the lowest value and a status of "IN DECK." At steps 916 and 918, CPU 102 is instructed to update the identified card record to indicate that it has been dealt. This is accomplished by updating the contents of status field 316 to "DEALT," and populating time dealt field 320 and duration field 322 with data representing the current system time and a display duration, respectively. The display duration may be a fixed value, such as 120 seconds, or it may be randomly assigned within a range of values, depending on the implementation. At step 920, the card is displayed on the video display by CPU 102.

Referring now to FIG. 10, a flowchart is presented depicting the process steps of card placement routine 1000. Generally, card placement routine 1000 processes a user request to place or discard a dealt card. At step 1010, CPU 102 is instructed to determine whether a card discard signal has been received indicating that the player has requested the dealt card to be discarded. If a card discard signal is received, decision step 1012 directs CPU 102 to process steps 1014 and 1016. At step 1014, CPU 102 updates status field 316 of the record representing the most recently dealt card. The status field is changed to reflect a status of "DISCARDED." At step 1016, CPU 102 removes the card from video display 500.

If a card discard signal is not received, CPU 102 determines whether a card placement signal has been received at step 1018. If a card placement signal has not been received, decision block 1020 directs CPU 102 to end card placement process 1000. Otherwise, CPU 102 processes step 1022, 1024 and 1026 to complete a card placement At step 1022, CPU 102 receives the location selection of the player identifying the location to which the dealt card is to be placed. At step 1024, the contents of location field 318 of the record representing the dealt card is updated to reflect the placement of the card. Card placement routine concludes with step 1026 which instructs CPU 102 to display the card at the selected location. Although step 1026 may simply entail erasing the card from the dealt location and redisplaying it at the selected location, step 1026 may be performed using animation.

The card status monitor/update routine 1100 will now be described with reference to FIGS. 11A and 11B. Routine 1100 is performed for every record representing a displayed card and begins with step 1110, wherein CPU 102 is instructed to determine whether to display a warning indicia. Typically, a warning indicia will be displayed for a short time prior to the time that a card changes or expires. The determination of step 1112 can be accomplished by comparing the system time to the contents of time dealt field 320 plus the contents of duration field 322 less some predetermined constant representing a warning duration. If a warning is required, decision step 1112 directs CPU 102 to process steps 1114 and 1116. Step 1114 directs CPU 102 to update status field 316 of the record corresponding to the card that is about to change or expire. Depending on the contents of status field 316, step 1114 causes the status to change from "DEALT" to "FIRST ALTERATION WARNING," from "FIRST ALTERATION" to "FINAL ALTERATION WARNING," or from "FINAL ALTERATION" to "EXPIRATION WARNING." The appropriate warning indicia, such as a flashing border or highlighted card, is displayed on video display 500 at step 1116.

If no warning is required, step 1112 directs CPU 102 to determine whether the display duration of the card has elapsed, as shown by step 1118. If the display duration has not elapsed, decision block 1120 terminates routine 1100. Otherwise, it determines whether the card is expiring or changing its value at step 1122. If the card is not changing its value, decision step 1124 instructs CPU 102 to continue processing at step 1130. If the card is expiring, CPU 102 processes step 1126 and updates status field 316 of the record with data indicating that the card is "DISCARDED." At step 1128, CPU 102 removes the card from the field of play on video display 500.

Process steps 1130–1138 describe the steps required to change the attributes of a card. At step 1130, CPU 102 identifies a replacement record in card database 300. The replacement record may be selected in any number of manners including randomly selecting the replacement record from all records representing the cards in the deck or selecting the record representing the next available card from the deck. At step 1132, CPU 102 updates status field 316, location field 318, time dealt field 320 and duration field 322 of the replacement card record. Step 1132 initializes the replacement record to take the place of the displayed record. Status field 316 of the replacement record is changed to "DEALT." Location field 318 of the replacement record is set equal to location field 318 of the displayed record. Time dealt field 320 is populated with the system time. Duration field 322 may be populated with a fixed time or a randomly generated time from within a range of possible durations.

At step 1134, CPU 102 updates status field 316 of the record representing the displayed card to indicate that the card has been "DISCARDED." At step 1136, CPU 102 removes the displayed card from the field of play on video display 500. At step 1138, CPU 102 displays the card represented by the replacement record.

Referring now to FIG. 12, a flowchart is presented depicting the process steps of shuffle discard routine 1200. Generally, shuffle discard routine 1200 simulates the shuffling of the discarded cards. At step 1210, CPU 102 determines whether the discarded cards should be shuffled. Such a determination may be based on the number of records representing cards in the deck, or the number of records representing discarded cards. If the discarded cards should be shuffled, decision step 1212 directs CPU 102 to continue processing at step 1214. Otherwise, CPU 102 is directed to terminate the routine.

At step 1214, CPU 102 randomly reassigns all of the card identifiers to the records having a status of "DISCARDED." Step 1214 essentially shuffles the card identifiers of the records representing discarded cards. At step 1216, CPU 102 changes the contents of status field 316 to "IN DECK" for all records having status field 316 containing "DISCARDED." At step 1218, CPU 102 populates location field 318 of the shuffled records with the corresponding card identifier to indicate the position within the deck. Although the preferred embodiment envisions placing the shuffled cards at the end of the deck, other variations are possible. Note that for embodiments in which an infinite deck is used, there is no need to shuffle the discards as there is an inexhaustible supply of new cards to be dealt.

Referring now to FIG. 13, a flowchart is presented depicting the process steps of payout calculation routine 1300. At step 1310, CPU 102 determines whether a payout request signal has been received from the player. At decision step 1312, if no payout request signal has been received, the routine terminates. Otherwise, CPU 102 identifies the hand that the player has requested to cash out at step 1314. At step 1316, CPU 102 determines the outcome of the hand based on the records corresponding to the displayed cards of the identified hand. Determining the outcome of step 1316 is essentially determining the strength of the hand (e.g. three of a kind or a straight). For those hands in which fewer than five cards are required (e.g. three of a kind) the remaining cards may have an assigned class of a null game element so as to allow analysis of hands without five cards placed. At step 1318, CPU 102 retrieves a payout corresponding to the determined outcome, and awards the payout at step 1320. Awarding the payout may include activating hopper 130 to dispense the awarded payout or updating credit data (not shown) stored by data storage device 104. Payout levels may depend on the number of coins wagered per card dealt.

Referring now to FIG. 14, there is shown a plan view of gaming device 1400, a slot machine for conducting a game of chance in accordance with an alternate embodiment of the present invention. Gaming device 1400 not only includes conventional components of a traditional three reel slot machine, but also many of the components of gaming device 100 described with respect to the video poker embodiment illustrated by FIGS. 1–13.

As shown, gaming device 1400 includes a conventional three reel slot machine mechanism on the lower portion of the device. After placing a wager, a player begins a slot machine game by pulling the traditional slot handle or by pressing start button 1420. Beginning a game initiates the rotation of the three slot reels, reel 1432, reel 1434 and reel 1436. At least one slot reel includes a reel stop 1430 bearing a new card symbol representing a new card.

Unlike gaming device 100, a player may not simply purchase a new card to play the video poker game displayed on the upper portion of gaming device 1400. A new card is provided to a player only upon spinning the slot reels and achieving a result including new card symbol 1430. Upon achieving a result including new card symbol 1430, a game element request signal is generated based on the slot result and the player is provided a new card for the video poker game, the player proceeding with the video poker game as previously described with reference to FIGS. 1–13.

Gaming device 1400 allows a player to participate in two games simultaneously, thereby enhancing the gaming experience. Gaming device 1400 further encourages a player to initiate more plays per hour in order to achieve as many new card symbols 1430 as possible to complete or improve poker hand 1440 or 1410, displayed in the upper display area of the device.

While the best mode for carrying out the invention has been described in detail, those familiar with the art to which the invention relates will recognize various alternative designs and embodiments for practicing the invention. These alternative embodiments are within the scope of the present invention. Accordingly, the scope of the present invention embodies the scope of the claims appended hereto.

What is claimed is:

1. A method for directing a computing device to conduct a game of chance, the method comprising [the steps of]:

(*a*) [generating] *causing a processor to generate* a representation of a card having a first [class] *rank and a first suit*;

(*b*) [displaying] *causing the processor to operate with a display device to display* the representation of the card *at a game set location*, thereby displaying an indicia of the first [class] *rank at the game set location and an indicia of the first suit at the game set location*; [and]

(*c*) causing the processor to determine a forthcoming expiration of at least one of (1) the indicia of the first suit at the game set location separately from the indicia of the first rank at the game set location, and (2) the indicia of the first rank at the game set location separately from the indicia of the first suit at the game set location;

(*d*) [displaying] *if the determination is the forthcoming expiration of the indicia of the first suit at the game set location, cause the processor to operate with the display device to display* an indicia representing *the* forthcoming expiration of *the indicia of the first suit at the game set location; and*

[the first class corresponding to the representation of the card.]

(*e*) *if the determination is the forthcoming expiration of the indicia of the first rank at the game set location, cause the processor to operate with display device to display an indicia representing the forthcoming expiration of the indicia of the first rank at the game set location.*

2. The method of claim 1, wherein [the step of displaying an] *causing the processor to operate with the display device to display the* indicia representing *the* forthcoming expiration of [the first class] *the indicia of the first suit at the game set location or the indicia of the first rank at the game set location* includes displaying a countdown display.

3. An apparatus[,] comprising:

a storage device; and a processor in communication with the storage device, the storage device storing a program for controlling the processor; and the processor operative with the program to: [perform the method of claim 1]

(*i*) *generate a representation of a card having a first rank and a first suit;*

(*ii*) *display the representation of the card at a game set location, thereby displaying an indicia of the first rank at the game set location and an indicia of the first suit at the game set location;*

(*iii*) *determine a forthcoming expiration of at least one of (1) the indicia of the first suit at the game set location separately from the indicia of the first rank at the game set location, and (2) the indicia of the first rank at the game set location separately from the indicia of the first suit at the game set location;*

(*iv*) *if the determination is the forthcoming expiration of the indicia of the first suit at the game set location, display an indicia representing the forthcoming expiration of the indicia of the first suit at the game set location; and*

(*v*) *if the determination is the forthcoming expiration of the indicia of the first rank at the game set location, display an indicia representing the forthcoming expiration of the first rank at the game set location.*

4. A *non-transitory computer readable* medium encoded with a program [for implementing a method], said program for directing a device to [perform the steps of: the method of claim 1]:

(*i*) *generate a representation of a card having a first rank and a first suit;*

(*ii*) *display the representation of the card at a game set location, thereby displaying an indicia of the first class at the game set location and the indicia of the first rank at the game set location;*

(*iii*) *determine a forthcoming expiration of at least one of (1) the indicia of the first suit at the game set location separately from the indicia of the first rank at the game set location, and (2) the indicia of the first rank at the game set location separately from the indicia of the first suit at the game set location;*

(*iv*) *if the determination is the forthcoming expiration of the first suit at the game set location, display an indicia representing the forthcoming expiration of the indicia of the first suit at the game set location; and*

(*v*) *if the determination is the forthcoming expiration of the indicia of the first rank at the game set location, display an indicia representing the forthcoming expiration of the first rank at the game set location.*

5. A method comprising:

(a) [receiving] *causing a processor to operate with an input device to receive* a first request for a card;

(b) [generating] *causing the processor to generate* a first representation of a card having a first rank and a first suit;

(c) [displaying] *causing the processor to operate with a display device to display* the first representation at a location for new cards, thereby displaying an indicia of the first rank *at the location for new cards* and an indicia of the first suit *at the location for new cards*;

(d) [receiving] *causing the processor to operate with the input device to receive* a placement signal, the placement signal indicating a card location of a game set that comprises a plurality of card locations;

(e) [displaying] *causing the processor to operate with the display device to display* the first representation at the card location of the game set, *thereby displaying the indicia of the first rank at the card location of the game set and the indicia of the first suit at the card location of the game set*;

(f) *causing the processor to,* in response to expiration of a period of time, [assigning]*assign* to the first representation *at the card location of the game set* at least one of (*1*) a second rank [and a second suit] *separately from a second suit, and* (*2*) *a second suit separately from a second rank*;

(g) [displaying] *if the assignment to the first representation is a second rank, causing the processor to operate with the display device to display* the first representation *at the card location of the game set*, thereby displaying [at least one of] an indicia of the *assigned* second rank *at the card location of the game set;*

(h) [receiving at least one of] *if the assignment to the first representation is a second suit, causing the processor to operate with the display device to display the first representation at the card location of the game set, thereby displaying* an indicia of the *assigned* second [suit] *rank at the card location of the game set*;

(i) [receiving] *causing the processor to operate with the input device to receive* a second request for a card;

(j) [generating] *causing the processor to generate* a second representation *of a card* having a third rank and a third suit; and (k) *causing the processor to operate with the display device to,* before the expiration of the period of time, [displaying] *display* the second representation *of the card* at the location for new cards, thereby displaying an indicia of the third rank *at the card location for new cards* and an indicia of the third suit *at the card location for new cards*.

6. A method comprising:

(a) [generating] *causing a processor to generate* a first subject game element having a [first class] *first rank and a first suit*;

(b) [displaying] *causing the processor to operate with a display device to display* the first subject game element at a [first location] *new card location*, thereby displaying an indicia of the first [class] *rank and an indicia of the first suit*;

(c) *causing the processor to,* in response to expiration of a period of time, [assigning a second class to the first subject game element] *assign to the first subject game element at least one of* (*1*) *a second rank separately from a second suit, and* (*2*) *a second suit separately from a second rank*;

(d) [displaying] *if the assignment to the first subject game element is a second rank, causing the processor to operate with the display device to display* the first subject game element at [a second location] *a game set location*, thereby displaying an indicia of [the second class] *the assigned second rank at the game set location*;

(e) *if the assignment to the first subject game element is a second suit, causing the processor to operate with the display device to display the first subject game element at the game set location, thereby displaying an indicia of the assigned second suit at the game set location;*

(f) [generating] *causing the processor to generate* a second subject game element having a [third class] *third rank and a third suit*; *and*

(g) *causing the processor to operate with the display device to,* before the expiration of the period of time, [displaying] *display* the second subject game element at the [first] *new card* location, thereby displaying an indicia of the third [class] *rank at the new card location and an indicia of the third suit at the new card location*.

7. The method of claim 6, further comprising: [receiving] *causing the processor to operate with the display device and an input device to, receive* a placement signal[;] in which [displaying] *the display of* the first subject game element at the [second] *game set* location comprises[:] displaying the first subject game element at the [second] *game set* location based on the placement signal.

8. The method of claim 7, in which [displaying] *causing the processor to operate with the display device to, display* the first subject game element at the [second] *game set* location comprises[:] displaying the first subject game element at the [second] *game set* location before the expiration of the period of time.

9. A method comprising:

(a) [displaying] *causing a processor to operate with a display device to display* a first representation of a card at a [first location] *new card location*, the first representation including an indicia of a first [class] *rank and an indicia of a first suit*;

(b) [determining] *causing the processor to determine* expiration of a period of time;

(c) [receiving] *causing the processor to operate with the input device to receive* a placement signal from a player, the placement signal indicating a [second] *game set* location;

(d) *causing the processor to operate with the display device to,* before the expiration of the period of time, [displaying] *display* the first representation at the [second] *game set* location;

(e) *causing the processor to operate with the display device to,* before the expiration of the period of time, [displaying] *display* a second representation of a card at the [first location] *new card location*, the second representation including an indicia of a second [class] *rank and an indicia of a second suit*;

(f) *causing the processor to,* in response to the expiration of the period of time, [assigning] *assign to the first representation at least one of* (*1*) a third [class to the first representation] *rank separately from a third suit and* (*2*) *a third suit separately from a third rank*; [and]

(g) [displaying] *if the assignment to the first representation is the third rank, causing the processor to operate with the display device to display* the first representation *at the game set location*, the first representation *at the game set location* including [an indicia of] *a display of an indicia of* the *assigned* third [class] *rank; and*

(h) *if the assignment to the first representation is the third suit, causing the processor to operate with the display device to display the first representation at the game set*

*location, the first representation at the game set location including a display of an indicia of the assigned third suit.*

10. A method comprising:

(*a*) [generating] *causing a processor to generate* a subject game element having [a first class] *a first rank and a first suit*;

(*b*) [displaying] *causing the processor to operate with a display device to display* the subject game element at a [first location] *new card location*, thereby displaying an indicia of the first [class] *rank and an indicia of the first suit*;

(*c*) [receiving] *causing the processor to operate with an input device to receive* from a player a placement signal that indicates a [second location] *game set location*;

(*d*) [displaying] *causing the processor to operate with the display device to display* the subject game element at the [second location;] *game set location,*

(*e*) *causing the processor to determine a forthcoming expiration of at least one of (1) the indicia of the first suit at the game set location separately from the indicia of the first rank at the game set location, and (2) the indicia of the first rank at the game set location separately from the indicia of the first suit at the game set location;*

(*f*) [displaying] *if the determination is the forthcoming expiration of the indicia of the first suit at the game set location, causing the processor to operate with the display device to display* an indicia representing *the* forthcoming expiration of the *indicia of the first suit at the game set location,*

(*g*) [subject game element] *if the determination is the forthcoming expiration of the indicia of the first rank at the game set location, causing the processor to operate with the display device to display an indicia representing the forthcoming expiration of the indicia of the first rank at the game set location*; and (*h*) [receiving] *causing the processor to operate with the input device to receive* a signal via a lock button, the signal effective to prevent the [subject game element from expiring] *expiration of at least one of (1) the indicia of the first suit at the game set location or the indicia of the first rank at the game set location, and (2) the indicia of the first rank at the game set location or the indicia of the first suit at the game set location.*

[11. A method comprising:

generating a subject game element having a first class;

displaying the subject game element at a first location, thereby displaying an indicia of the first class;

receiving from a player a placement signal that indicates a second location;

displaying the subject game element at the second location;

displaying an indicia representing forthcoming expiration of the first class; and receiving a signal via a lock button, the signal effective to prevent the first class from expiring.]

[12. A method comprising:

generating a subject game element having a first class;

displaying the subject game element at a first location, thereby displaying an indicia of the first class;

receiving from a player a placement signal that indicates a second location;

displaying the subject game element at the second location;

displaying an indicia representing forthcoming change of the subject game element; and receiving a signal via a lock button, the signal effective to prevent the subject game element from changing.]

13. A method comprising:

(*a*) [generating] *causing a processor to generate* a subject game element having [a first class] *first rank and a first suit*;

(*b*) [displaying] *causing the processor to operate with a display device to display* the subject game element at a [first location] *new card location*, thereby displaying an indicia of the first [class] *rank and an indicia of the first suit*;

(*c*) [receiving] *causing the processor to operate with an input device to receive* from a player a placement signal that indicates a [second location] *game set location*; *and*

(*d*) [displaying] *causing the processor to operate with the display device to display* the subject game element at the [second location] *game set location*; [and]

(*e*) [displaying an indicia representing forthcoming expiration of the first class] *causing the processor to determine a forthcoming expiration of at least one of (1) the indicia of the first suit at the game set location separately from the indicia of the first rank at the game set location, and (2) the indicia of the first rank at the game set location separately from the indicia of the first suit at the game set location;*

(*f*) *if the determination is the forthcoming expiration of the first suit at the game set location, causing the processor to operate with the display device to display an indicia representing the forthcoming expiration of the indicia of the first suit at the game set location; and*

(*g*) *if the determination is the forthcoming expiration of the first rank at the game set location, causing the processor to operate with the display device to display an indicia representing the forthcoming expiration of the indicia of the first rank at the game set location.*

[14. A method comprising:

generating a subject game element having a first class;

displaying the subject game element at a first location, thereby displaying an indicia of the first class;

receiving from a player a placement signal that indicates a second location;

displaying the subject game element at the second location; and displaying an indicia representing forthcoming expiration of the subject game element.]

15. A method comprising:

(*a*) [generating] *causing a processor to generate* a subject game element having a first [class] *rank and a first suit*;

(*b*) [displaying] *causing the processor to operate with the display device to display* the subject game element at a [first location] *new card location*, thereby displaying an indicia of the first [class] *rank and an indicia of the first suit*;

(*c*) *causing the processor to,* in response to expiration of a period of time, [assigning a second class] *assign* to the subject game element *at least one of (1) a second rank separately from a second suit, and (2) a second suit separately from a second rank*;

(*d*) [receiving] *causing the processor to operate with an input device to receive* from a player a placement signal that indicates a [second] *game set* location; [and]

(*e*) [displaying] *if the assignment to the subject game element is the second rank, causing the processor to operate with the display device to display* the subject game element at the [second] *game set* location, thereby displaying an indicia of the [second class] *second rank at the game set location; and*

(*f*) *if the assignment to the subject game element is the second suit, causing the processor to operate with the*

*display device to display the subject game element at the game set location, thereby displaying an indicia of the second suit at the game set location.*

16. A method comprising:

(*a*) [generating] *causing a processor to generate* a subject game element having [a first class] *a first rank and a first suit*;

(*b*) [displaying] *causing the processor to operate with the display device to display* the subject game element at a [first location] *new card location*, thereby displaying an indicia of the [first class] *first rank and an indicia of the first suit*;

(*c*) [receiving] *causing the processor to operate with an input device to receive* from a player a placement signal that indicates a [second location] *game set location*;

(*d*) [displaying] *causing the processor to operate with the display device to display* the subject game element at the [second location] *game set location*, thereby displaying the indicia of the first [class] *rank at the game set location and the indicia of the first suit at the game set location*;

(*e*) *causing the processor to,* in response to expiration of a period of time, [assigning a second class to the subject game element] *assign to the subject game element at the game set location at least one of* (*1*) *a second rank separately from a second suit, and* (*2*) *a second suit separately from a second rank*; and (*f*) [displaying] *causing the processor to operate with the display device to display* the subject game element at the [second location] *game set location*, thereby displaying *at least one of* an indicia of the [second class] *assigned second rank at the game set location and an indicia of the assigned second suit at the game set location.*

[17. A method comprising:

generating a subject game element having a first class;

displaying the subject game element at a first location, thereby displaying an indicia of the first class;

receiving from a player a placement signal that indicates a second location;

displaying the subject game element at the second location;

displaying an indicia representing forthcoming expiration of the subject game element; and in response to expiration of a period of time, erasing the subject game element.]

*18. An apparatus comprising:*

*a storage device; and*

*a processor in communication with the storage device,*

*the storage device storing a program for controlling the processor; and*

*the processor operative with the program to:*

(*i*) *generate a subject game element having a first rank and a first suit;*

(*ii*) *display the subject game element at a new card location, thereby displaying an indicia of the first rank and an indicia of the first suit;*

(*iii*) *receive from a player a placement signal that indicates a game set location;*

(*iv*) *display the subject game element at the game set location;*

(*v*) *determine a forthcoming expiration of at least one of* (*1*) *the indicia of the first suit at the game set location separately from the indicia of the first rank at the game set location, and* (*2*) *the indicia of the first rank at the game set location separately from the indicia of the first suit at the game set location;*

(*vi*) *if the determination is the forthcoming expiration of the indicia of the first suit at the game set location, display an indicia representing the forthcoming expiration of the indicia of the first suit at the game set location; and*

(*vii*) *if the determination is the forthcoming expiration of the indicia of the first rank at the game set location, display an indicia of the forthcoming expiration of the indicia of the first rank at the game set location.*

*19. A non-transitory computer readable medium encoded with a program, said program for directing a device to:*

(*i*) *generate a subject game element having a first rank and a first suit;*

(*ii*) *display the subject game element at a location for new cards, thereby displaying an indicia of the first rank and an indicia of the first suit;*

(*iii*) *receive from a player a placement signal that indicates a game set location;*

(*iv*) *display the subject game element at the game set location;*

(*v*) *determine a forthcoming expiration of at least one of* (*1*) *the indicia of the first suit at the game set location separately from the indicia of the first rank at the game set location, and* (*2*) *the indicia of the first rank at the game set location separately from the indicia of the first suit at the game set location;*

(*vi*) *if the determination is the forthcoming expiration of the first suit at the game set location, display an indicia representing the forthcoming expiration of the indicia of the first suit at the game set location; and*

(*vii*) *if the determination is the forthcoming expiration of the first rank at the game set location, display an indicia representing the forthcoming expiration of the indicia of the first rank at the game set location.*

* * * * *

UNITED STATES PATENT AND TRADEMARK OFFICE

CERTIFICATE OF CORRECTION

PATENT NO. : RE43,114 E
APPLICATION NO. : 11/084872
DATED : January 17, 2012
INVENTOR(S) : Jay S. Walker et al.

It is certified that error appears in the above-identified patent and that said Letters Patent is hereby corrected as shown below:

IN THE CLAIMS:

In Claim 1, column 11, lines 59 to 64, italicize all text between "*(c)*" and "*(d)*" to denote that it was added during reissue prosecution.

In Claim 3, column 12, line 22, replace ";" with --,--.

In Claim 4, column 12, line 52, before "*indicia*" replace "*the*" with --*an*--.

In Claim 5, column 13, line 37, replace "*rank*" with --*suit*--.

In Claim 8, column 14, line 27, after "*device to*" delete ",".

In Claim 9, column 14, line 38, after "*determine*" add --*an*--.

In Claim 10, column 15, line 19, replace "," with --;--.

In Claim 10, column 15, line 31, replace "," with --;--.

In Claim 13, column 16, line 12, delete "*and*".

Signed and Sealed this
Tenth Day of July, 2012

David J. Kappos

David J. Kappos
*Director of the United States Patent and Trademark Office*